United States Patent
Lee et al.

(10) Patent No.: US 11,847,274 B2
(45) Date of Patent: Dec. 19, 2023

(54) TOUCH DISPLAY DEVICE AND TOUCH PANEL

(71) Applicant: LG Display Co., Ltd., Seoul (KR)

(72) Inventors: JaeGyun Lee, Gyeonggi-do (KR); KwangJo Hwang, Gyeonggi-do (KR); JiHyun Jung, Gyeonggi-do (KR); DeukSu Lee, Gyeonggi-do (KR); SuChang An, Seoul (KR); Ruda Rhe, Seoul (KR); Yangsik Lee, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/993,761

(22) Filed: May 31, 2018

(65) Prior Publication Data

US 2018/0348910 A1 Dec. 6, 2018

(30) Foreign Application Priority Data

Jun. 1, 2017 (KR) .......................... 10-2017-0068360

(51) Int. Cl.
 G06F 3/041 (2006.01)
 G06F 3/044 (2006.01)
(52) U.S. Cl.
 CPC .......... *G06F 3/0416* (2013.01); *G06F 3/0412* (2013.01); *G06F 3/0418* (2013.01); *G06F 3/0443* (2019.05); *G06F 3/0445* (2019.05); *G06F 3/0446* (2019.05); *G06F 3/0448* (2019.05); *G06F 2203/04111* (2013.01); *G06F 2203/04112* (2013.01)

(58) Field of Classification Search
None
See application file for complete search history.

(56) References Cited

U.S. PATENT DOCUMENTS 9,081,458 B2 7/2015 Zhou et al.
9,170,689 B2 10/2015 Nakamura et al.
(Continued)

FOREIGN PATENT DOCUMENTS

CN 102738198 A 10/2012
CN 103049149 A 4/2013
(Continued)

OTHER PUBLICATIONS

European Search Report dated Oct. 10, 2018 issued in the corresponding European Patent Application No. 18175584.4, pp. 1-9.
(Continued)

*Primary Examiner* — Benjamin X Casarez
(74) *Attorney, Agent, or Firm* — POLSINELLI PC

(57) ABSTRACT

A touch display device includes a plurality of touch electrodes and a plurality of touch lines electrically connected to at least some of the plurality of touch electrodes arranged on a touch panel and an outermost peripheral touch electrode located at an outermost peripheral region of the touch panel has an extension part; a touch circuit driving the touch panel and sensing a touch or a touch position; a capacity compensation pattern disposed at the touch panel and vertically overlapping the extension part of the outermost peripheral touch electrode, wherein the plurality of touch lines is located at an outside area of the capacity compensation pattern.

21 Claims, 27 Drawing Sheets

(56) References Cited

U.S. PATENT DOCUMENTS

| | | | |
|---|---|---|---|
| 9,201,554 | B2 | 12/2015 | Lee |
| 9,495,031 | B2 | 11/2016 | Omoto |
| 9,853,092 | B2* | 12/2017 | Lee ................... G06F 3/0446 |
| 10,007,377 | B2 | 6/2018 | Cao |
| 10,055,073 | B2 | 8/2018 | Ono et al. |
| 10,209,826 | B2 | 2/2019 | Ono et al. |
| 2010/0171718 | A1* | 7/2010 | Denda ................ G06F 3/0445 |
| | | | 345/173 |
| 2011/0193817 | A1 | 8/2011 | Samsung |
| 2012/0044191 | A1* | 2/2012 | Shin .................... G06F 3/044 |
| | | | 345/174 |
| 2013/0093721 | A1 | 4/2013 | Nakamura et al. |
| 2013/0307822 | A1 | 11/2013 | Huang et al. |
| 2014/0333556 | A1* | 11/2014 | Lin ..................... G06F 3/041 |
| | | | 345/173 |
| 2015/0185903 | A1* | 7/2015 | Park .................... G06F 3/044 |
| | | | 345/173 |
| 2015/0220202 | A1* | 8/2015 | Choung ............. G06F 3/0446 |
| | | | 345/174 |
| 2015/0346866 | A1 | 12/2015 | Kusunoki et al. |
| 2016/0041651 | A1* | 2/2016 | Nakamura .......... G06F 3/044 |
| | | | 345/174 |
| 2016/0139708 | A1 | 5/2016 | Tseng et al. |
| 2016/0202833 | A1 | 7/2016 | Kim et al. |
| 2016/0313860 | A1 | 10/2016 | Ono et al. |
| 2017/0131842 | A1* | 5/2017 | Hashiguchi ......... G06F 3/0412 |
| 2018/0018053 | A1* | 1/2018 | No ..................... G06F 3/03545 |
| 2018/0113545 | A1* | 4/2018 | Shim ................ G02F 1/133345 |
| 2018/0129352 | A1* | 5/2018 | Kim .................... G06F 3/0412 |
| 2018/0151627 | A1* | 5/2018 | Seo .................... G06F 3/0412 |
| 2018/0197924 | A1* | 7/2018 | Tada .................... H01L 27/323 |
| 2018/0348911 | A1* | 12/2018 | Lee .................... G06F 3/044 |

FOREIGN PATENT DOCUMENTS

| | | |
|---|---|---|
| CN | 103513837 A | 1/2014 |
| CN | 103901650 A | 7/2014 |
| CN | 104252275 | 12/2014 |
| CN | 105138195 A | 12/2015 |
| CN | 105204248 A | 12/2015 |
| CN | 105388655 A | 3/2016 |
| CN | 105607771 A | 5/2016 |
| CN | 106066727 A | 11/2016 |
| CN | 106155411 A | 11/2016 |
| EP | 2781995 A3 | 9/2014 |
| JP | 2012-208263 | 10/2012 |
| JP | 2013-016026 | 1/2013 |
| JP | 2014-527295 | 10/2014 |
| JP | 2016-038824 | 3/2016 |
| JP | 2016-110613 | 6/2016 |
| JP | 2016-206867 | 12/2016 |
| KR | 10-2012-0012005 A | 2/2012 |
| KR | 10-2016-0017336 A | 2/2016 |
| WO | WO2012/108342 | 8/2012 |

OTHER PUBLICATIONS

JP Office Action issued in co-pending Japanese Patent Application No. 2018-105948 dated Aug. 13, 2019.

Office Action in co-pending Chinese Patent Application No. 201810558098.0 dated Dec. 29, 2020, with English translation.

Office Action dated Jun. 16, 2021 issued in Chinese Patent Application No. 201810558098.0 w/English Translation (18 pages).

Examination Report dated Jun. 7, 2021 issued in European Patent Application No. 18175584.4 (9 pages).

Oral Proceeding issued in European Patent Application No. 18175584.4, dated Nov. 9, 2022 (9 pages).

* cited by examiner

Mesh Type TE

Mesh Type TE

TOUCH DISPLAY DEVICE AND TOUCH PANEL

CROSS-REFERENCE TO RELATED APPLICATION

This application claims priority from Korean Patent Application No. 10-2017-0068360, filed on Jun. 1, 2017, which is hereby incorporated by reference in its entirety for all purposes as if fully set forth herein.

BACKGROUND

Field of the Disclosure

The present disclosures relate to a display device, and more particularly, to a touch display device and a touch panel.

Description of the Background

As an information-oriented society develops, a demand for a display device for displaying an image increases in various types. Recently, various display devices such as a liquid crystal display device, a plasma display device, an organic light emitting display device, etc. have been utilized.

Among display devices, there is a touch display device that provides a touch-based input scheme allowing a user to instinctively and conveniently input information and a command easily, departing from the conventional input scheme, such as a button, a keyboard, a mouse, etc.

The touch display device should be able to recognize whether there is a user touch, and accurately detect the coordinates of the touch so as to provide the touch-based input scheme.

To this end, among various touch sensing schemes, a capacitance-based touch sensing scheme, by which whether there is a touch and touch coordinates are detected on the basis of a change in capacitance incurred in a plurality of touch electrodes, through the touch electrodes disposed on a touch panel, is commonly used.

In a touch panel of the conventional touch display device, a plurality of touch electrodes are arranged in a complex form. Therefore, there is a problem in that unnecessary parasitic capacitance can be incurred according to the electrode pattern structure of a touch panel or a display panel including a touch panel therein.

Also, the difference of parasitic capacitances, which occur in metal touch sensors, such as touch electrodes and touch lines, is large depending on a pattern in which the touch electrodes or the touch lines are arranged in a touch panel, and thus touch sensitivity is degraded.

SUMMARY

Accordingly, the present disclosure is to provide a touch display device and a touch panel, having a structure which can reduce the difference of parasitic capacitances, which occur in metal touch sensors, such as touch electrodes and touch lines, regardless of a pattern in which the metal touch sensors, such as the touch electrodes or the touch lines, are arranged in a touch panel.

Another aspect of the present disclosure is to provide a touch display device and a touch panel, having a structure which can reduce the difference of parasitic capacitances, which occur in metal touch sensors, such as touch electrodes and touch lines, even when the touch lines have different lengths.

Another aspect of the present disclosure is to provide a touch display device and a touch panel, having a parasitic capacitance difference reducing structure in a non-active area corresponding to a non-image display area.

Another aspect of the present disclosure is to provide a touch display device and a touch panel, having a parasitic capacitance difference reducing structure in an active area corresponding to an image display area.

The aspect of the present disclosure may provide a touch display device including a touch panel, in which a plurality of touch electrodes, and a plurality of touch lines electrically connected to all or some of the plurality of touch electrodes are arranged, and a touch circuit configured to drive the touch panel and sense whether there is a touch or a touch position.

A capacity compensation pattern may overlap a partial area of a first outermost peripheral touch electrode and a partial area of a second outermost peripheral touch electrode, and the size of an overlapping area between the first outermost peripheral touch electrode and the capacity compensation pattern and the size of an overlapping area between the second outermost peripheral touch electrode and the capacity compensation pattern may be different from each other.

The length of a first touch line electrically connected to the first outermost peripheral touch electrode is longer than the length of a second touch line electrically connected to the second outermost peripheral touch electrode, and the size of an overlapping area between the first outermost peripheral touch electrode and the capacity compensation pattern may be smaller than the size of an overlapping area between the second outermost peripheral touch electrode and the capacity compensation pattern.

The size of an area in which the first outermost peripheral touch electrode overlaps the capacity compensation pattern may be smaller than that of an area in which the second outermost peripheral touch electrode overlaps the capacity compensation pattern.

In the capacity compensation pattern, the width of a part in which the capacity compensation pattern overlaps the first outermost peripheral touch electrode may be smaller than the width of a part in which the capacity compensation pattern overlaps the second outermost peripheral touch electrode.

A ground voltage or a voltage having a level different from that of a voltage (the voltage of a touch driving signal, and the voltage of a touch sensing signal) applied to a touch electrode (driving touch electrode, and sensing touch electrode) may be applied to the capacity compensation pattern.

The aspect of the present disclosure may provide a touch panel including a plurality of touch electrodes; a plurality of touch lines electrically connected to all or some of the plurality of touch electrodes; and a capacity compensation pattern overlapping a partial area of at least one outermost peripheral touch electrode among outermost peripheral touch electrodes disposed at the outermost peripheral region among the plurality of touch electrodes.

The touch panel may be mounted inside or outside a display panel including an active area on which an image is displayed and a non-active area which is the outside area of the active area.

The capacity compensation pattern may be correspondingly located on the non-active area.

In at least one outermost peripheral touch electrode, a part in which the at least one outermost peripheral touch electrode does not overlap the capacity compensation pattern may be correspondingly located on the active area, and a part in which the at least one outermost peripheral touch electrode overlaps the capacity compensation pattern may be correspondingly located on the non-active area.

The aspect of the present disclosure described above can provide a touch display device and a touch panel, having a structure which can reduce the difference of parasitic capacitances, which occur in metal touch sensors, such as touch electrodes and touch lines, regardless of a pattern in which the metal touch sensors, such as the touch electrodes or the touch lines, are arranged in a touch panel.

In addition, the aspect of the present disclosure can provide a touch display device and a touch panel, having a structure which can reduce the difference of parasitic capacitances, which occur in metal touch sensors, such as touch electrodes and touch lines, even when the touch lines have different lengths.

In addition, the aspect of the present disclosure can provide a touch display device and a touch panel, having a parasitic capacitance difference reducing structure in a non-active area corresponding to a non-image display area.

In addition, the aspect of the present disclosure can provide a touch display device and a touch panel, having a parasitic capacitance difference reducing structure in an active area corresponding to an image display area.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
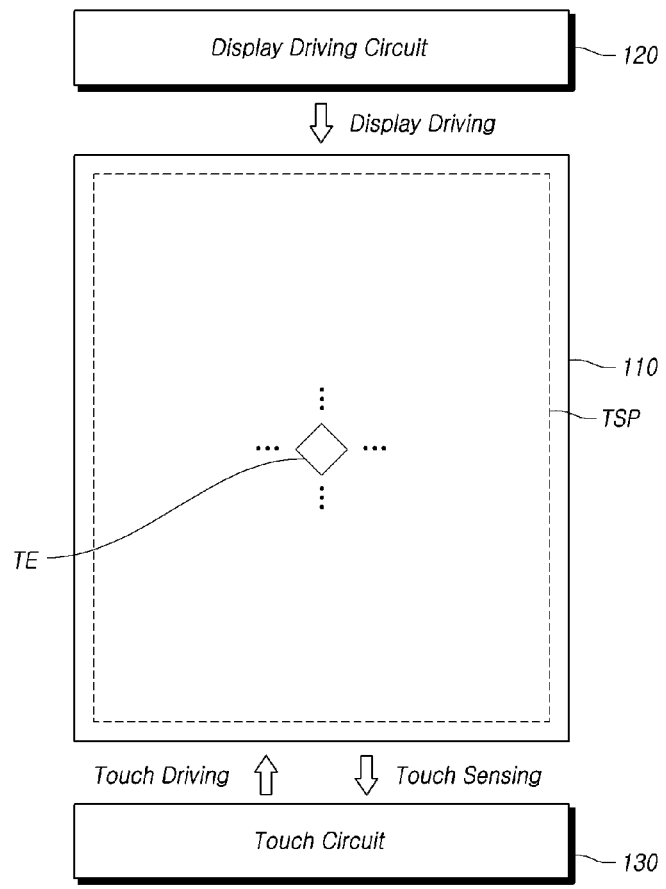
FIG. 1 is a system block diagram of a touch display device according to the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing elements of the present disclosure. Each of these terminologies is not used to define an essence, order, sequence, or the number of a corresponding element but used merely to distinguish the corresponding element from other element(s). In the case that it is described that a certain element "is connected to", "is coupled to", or "is in contact with" another element, it should be interpreted that another element may "be interposed between" the elements, or the elements may "be connected to", "be coupled to", or "be in contact with" each other through another element, as well as that the certain element is directly connected to or is in direct contact with another element.

FIG. 1 is a system block diagram of a touch display device 100 according to the present disclosure.

Referring to FIG. 1, the touch display device 100 according to the present disclosure provides an image display function for displaying an image and a touch sensing function of sensing a user touch.

In order to display an image, the touch display device 100 according to the present disclosure includes a display panel 110, in which data lines and gate lines are arranged therein, and a display driving circuit 120 configured to drive the display panel 110.

In view of functions, the display driving circuit 120 includes a data driving circuit configured to drive the data lines, a gate driving circuit configured to drive the gate lines, and a controller configured to control the data driving circuit and the gate driving circuit.

The display driving circuit 120 may be implemented by one or more integrated circuits.

In order to sense a touch, the touch display device 100 according to the present disclosure may include a touch panel TSP, in which a plurality of touch electrodes TE, as a touch sensor, are arranged, and a plurality of touch lines TL electrically connected to all or some of the plurality of touch electrodes TE are arranged, and a touch circuit 130 that drives the touch panel TSP to sense whether there is a touch or a touch position.

The touch circuit 130 supplies a touch driving signal to the touch panel TSP to drive the touch panel TSP, detects a touch sensing signal from the touch panel TSP, and senses whether there is a touch and/or a touch position (i.e., touch coordinates) on the basis of the detected touch sensing signal.

The touch circuit 130 may be implemented by including a touch driving circuit that supplies a touch driving signal and receives a touch sensing signal and a touch controller that calculates whether there is a touch and/or a touch position (touch coordinates). A touch driving signal may be a DC signal having a particular voltage value, or an AC type of signal that swings between a high level and a low level while having a predetermined amplitude, and includes a plurality of pulses.

The touch circuit 130 may be implemented by one or more components (e.g. integrated circuit) and may be implemented separately from the display driving circuit 120.

In addition, a part or the entirety of the touch circuit 130 may be implemented in an integrated manner with the display driving circuit 120 or an inner circuit thereof. For example, the touch driving circuit of the touch circuit 130 may be implemented by an integrated circuit together with the data driving circuit of the display driving circuit 120.

The touch display device 100 according to the present disclosure may sense a touch on the basis of capacitances incurred on the touch electrodes TE.

The touch display device 100 according to the present disclosure may sense a touch by using a mutual-capacitance-based touch sensing scheme or a self-capacitance-based touch sensing scheme, as a capacitance-based touch sensing scheme.

In the case of the mutual-capacitance-based touch sensing scheme, the plurality of touch electrodes TE may be sorted into a driving touch electrode (referred to as a driving electrode, a transmission electrode, or a driving line) to which a touch driving signal is applied, and a sensing touch electrode (referred to as a sensing electrode, a reception electrode, or a sensing line), by which a touch sensing signal is sensed and which incurs capacitance with a driving electrode.

Driving touch electrodes, which are arranged in the same row (or the same column) among driving touch electrodes among the touch electrodes (TE), are electrically connected to each other to constitute one driving touch electrode line.

Sensing touch electrodes, which are arranged in the same row (or the same column) among sensing touch electrodes among the touch electrodes TE, are electrically connected to each other to constitute one sensing touch electrode line.

In the case of the mutual-capacitance-based touch sensing scheme, whether there is a touch and/or touch coordinates are detected on the basis of the change in capacitance (mutual-capacitance) between a driving touch electrode (driving touch electrode line) and a touch sensing electrode (sensing touch electrode line) according to whether there is a pointer, such as a finger and a pen.

In the case of the self-capacitance-based touch sensing scheme, each of the touch electrodes TE has both the function of a driving touch electrode (applying a touch driving signal) and the function of a sensing touch electrode (detecting a touch sensing signal).

That is, a touch driving signal is applied to each of the touch electrodes TE and a touch sensing signal is received through the touch electrodes TE to which the touch driving signal has been applied. Therefore, in the self-capacitance-based touch sensing scheme, there is no difference between a driving electrode and a sensing electrode.

In the case of the self-capacitance-based touch sensing scheme, whether there is a touch and/or touch coordinates are detected on the basis of the change in capacitance between a pointer, such as a finger and a pen, and the touch electrodes TE.

As described above, the touch display device 100 according to the disclosure may sense a touch using a mutual-capacitance-based touch sensing scheme or a self-capacitance-based touch sensing scheme.

For convenience of explanation, an improved structure for enhancing touch sensitivity will be discussed for the touch display device 100 and the touch panel TSP adopting a mutual-capacitance-based touch sensing scheme in the following description. However, the improved structure for improving touch sensitivity may be similarly applied to the touch display device 100 and touch panel TSP adopting a self-capacitance-based touch sensing scheme.

In addition, the display panel 110 of the touch display device 100 according to the present disclosure may have various types, such as an Organic Light Emitting Diode (OLED) panel, a Liquid Crystal Display (LCD) panel. For convenience of explanation, the following description will be explained with an Organic Light Emitting Diode (OLED) panel as an example.

Figure 2:
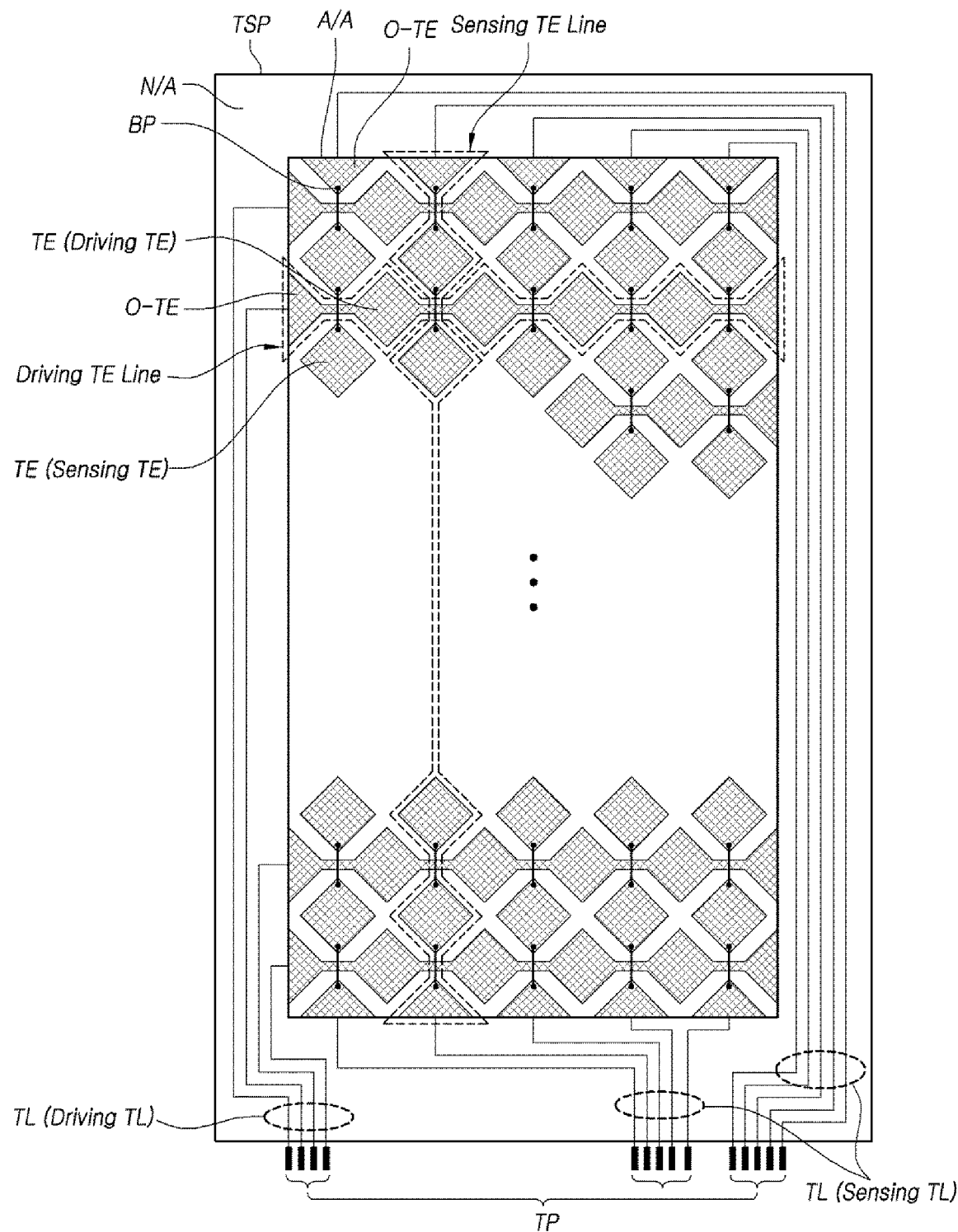
FIG. 2 is a diagram representing a touch panel according to the present disclosure.
Figure 3:
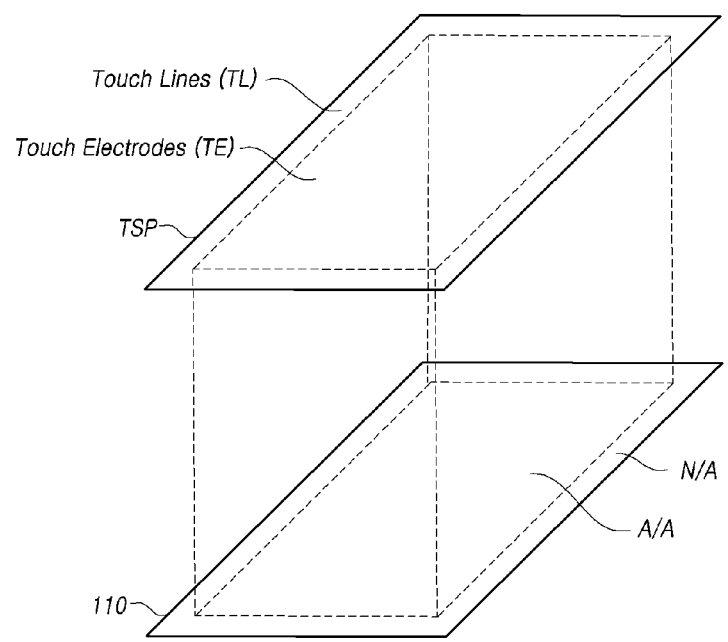
FIG. 3 is a diagram representing a relation between the regions of a display panel and a touch panel according to the present disclosure.

FIG. 2 is a diagram representing the touch panel TSP according to the present disclosure. FIG. 3 is a diagram representing a relation between areas of the display panel 110 and the touch panel TSP according to the present disclosure.

The touch panel TSP exemplified in FIG. 2 is a touch panel TSP for mutual-capacitance-based touch sensing.

Referring to FIG. 2, the plurality of touch electrodes TE are arranged in the touch panel TSP, and a plurality of touch lines TL may be arranged to electrically connect the touch electrodes TE and the touch circuit 130.

The plurality of touch lines TL may be electrically connected to the touch electrode TE disposed at the outermost peripheral region among the touch electrodes TE. In the following description, a touch electrode TE disposed at the outermost peripheral region is also called outermost peripheral touch electrode O-TE.

Touch pads which the touch circuit 130 contacts may exist in the touch panel TSP in order to electrically connect the touch lines TL and the touch circuit 130.

The touch electrodes TE and the touch lines TL may exist in the same layer or different layers.

When the above described touch display device 100 adopts a mutual-capacitance-based touch sensing scheme, two or more touch electrodes TE arranged in the same row (or the same column) may be electrically connected to each other to constitute a single driving touch electrode line (Driving TE Line). Two or more touch electrodes TE arranged in the same row (or the same column) may be electrically connected to each other to constitute a single sensing touch electrode line (Sensing TE Line).

Two or more touch electrodes TE constituting one driving touch electrode line (Driving TE Line) are electrically connected, and two or more touch electrodes may be integrated and thus electrically connected, or may be electrically connected by means of a bridge.

Two or more touch electrodes TE constituting one sensing touch electrode line (Sensing TE Line) are electrically connected, and two or more touch electrodes may be integrated and thus electrically connected, or may be electrically connected by a bridge.

In an example in FIG. 2, two or more touch electrodes TE constituting one driving touch electrode line (Driving TE Line) are integrated and thus electrically connected, and two or more touch electrodes TE constituting one sensing touch electrode line (Sensing TE Line) are electrically connected to each other by a bridge BP.

Two or more touch electrodes TE constituting one driving touch electrode line (Driving TE Line) are called a driving touch electrode (Driving TE). Two or more touch electrodes TE constituting one sensing touch electrode line (Sensing TE Line) are called a sensing touch electrode (Sensing TE).

At least one touch line TL may be connected to each driving touch electrode line, and at least one touch line TL may be connected to each sensing touch electrode line.

At least one touch line TL connected to each driving touch electrode line is called a driving touch line (Driving TL). At least one touch line TL connected to each sensing touch electrode line is called a sensing touch line (Sensing TL).

One touch pad TP may be connected to each of the touch lines TL.

Referring to FIG. 2, each of the plurality of touch electrodes TE may have, for example, a diamond shape, and a rectangular shape (may include a square shape) according to circumstances, in view of outline of the periphery thereof, and may have various shapes in addition to the above shapes.

The shape of a touch electrode TE may be variously designed in consideration of a display performance and a touch performance of the touch display device 100.

The touch panel TSP exemplified in FIG. 2 is illustrated longitudinally in a column direction, but may be designed longitudinally in a row direction depending on the type (e.g. a TV, a monitor, a mobile terminal, etc.) or the design of the touch display device 100.

The touch panel TSP according to the present disclosures may exist outside the display panel 110 (an externally mounted type), and may exist inside the display panel 110 (an internally mounted type).

When the touch panel TSP corresponds to an externally mounted type, the touch panel TSP and the display panel 110 may be separately manufactured in different panel manufacturing processes, and then bonded.

When the touch panel TSP corresponds to an internally mounted type, the touch panel TSP and the display panel 110 may be manufactured together in a single panel manufacturing process.

When the touch panel TSP corresponds to an internally mounted type, the touch panel TSP may be regarded as a group of the plurality of touch electrodes TE. A plate on which the plurality of touch electrodes TE are placed may be a dedicated substrate and may be a layer (e.g. an encapsulation layer) that has already existed in the display panel 110.

Referring to FIGS. 2 and 3, the display panel 110 includes an active area A/A on which an image is displayed and a non-active area N/A which is the outside area of the active area A/A. The active area A/A may be referred to as a display area, and the non-active area N/A may be referred to as a non-display area.

In the active area A/A, a plurality of subpixels defined by the data lines and the gate lines may be arranged.

Wires and pads configured to connect the data lines, the gate lines, and various signal wires in the active area A/A to the display driving circuit 120 may exist in the non-active area N/A.

The plurality of touch electrodes TE and the plurality of touch lines TL may be arranged in the touch panel TSP.

The plurality of touch electrodes TE may be located to correspond to the active area A/A of the display panel 110.

The plurality of touch lines TL may be located to correspond to the non-active area N/A of the display panel 110.

That is, the plurality of touch lines TL exist in the periphery of a touch electrode area (active area A/A or the area corresponding to the area) in which the plurality of touch electrodes TE are arranged.

The touch panel TSP may be mounted inside the display panel 110 or outside the display panel 110.

As described above, touch electrodes TE are arranged in the active area A/A of the display panel 110, and touch lines TL are arranged in the non-active area N/A of the display panel 110, thereby providing touch sensing matching a screen display state.

Referring to FIG. 2, each of the plurality of touch lines TL is electrically connected to the touch circuit 130.

Among the plurality of touch lines TL, each of driving touch lines (Driving TL) has one end electrically connected to a driving channel of the touch circuit 130 and the other end electrically connected to the outeroutermost peripheral touch electrode disposed at the outermost peripheral region among touch electrodes TE included in a corresponding driving Touch Electrode line (Driving TE Line).

Each of sensing touch lines (Sensing TL) among the plurality of touch lines TL has one end electrically connected to a sensing channel of the touch circuit 130, and the other end electrically connected to the outeroutermost peripheral touch electrode disposed at the outermost peripheral region among touch electrodes TE included in a corresponding sensing Touch Electrode line (Sensing TE Line).

As illustrated in FIG. 2, the plurality of touch lines TL may have different lengths. That is, at least one among the plurality of touch lines TL may have a length different from that of the other touch lines TL.

Accordingly, respective touch lines TL may have different signal transfer characteristics or electrical characteristics.

Figure 4:
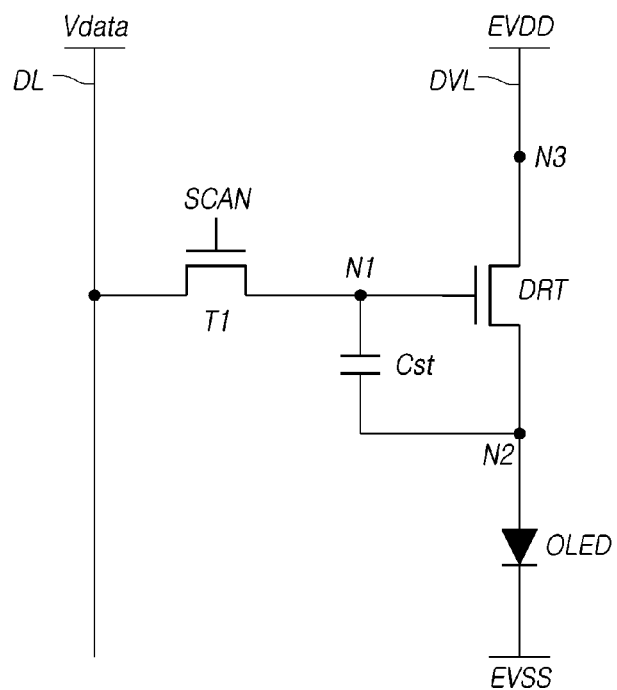
FIGS. 4 and 5 are examples of the structure of a subpixel of the touch display device according to the present disclosure.
Figure 5:
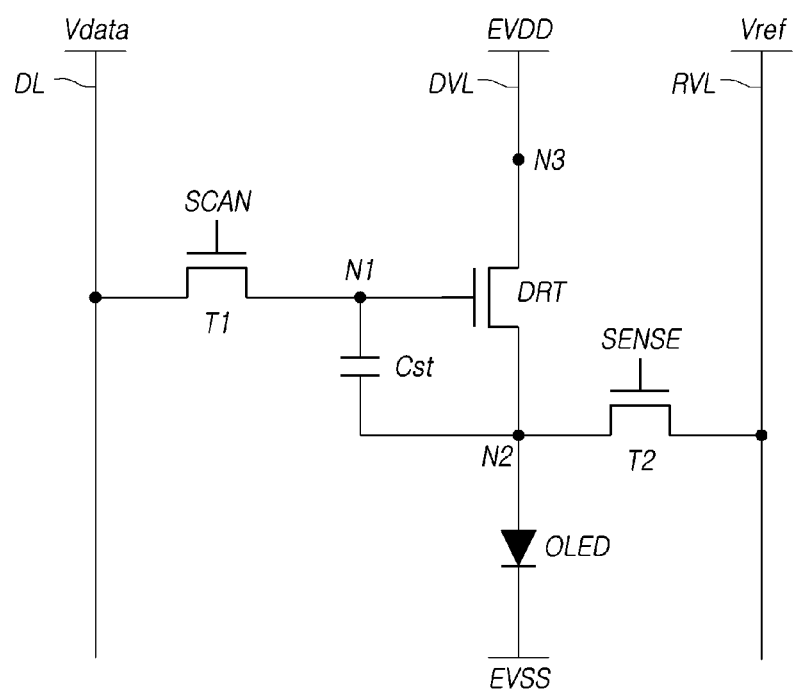

FIGS. 4 and 5 illustrate examples of the structure of a subpixel of the touch display device 100 according to the present disclosure.

FIGS. 4 and 5 illustrate examples of the structure of a subpixel when the touch panel 110 of the touch display device 100 according to the present disclosure is an organic light emitting display panel.

Referring to FIGS. 4 and 5, when the touch display device 100 according to the present disclosure is an organic light emitting display device, each subpixel may be configured by basically including: an organic light emitting diode OLED; a driving transistor DRT that drives the organic light emitting diode OLED; a first transistor T1 configured to transfer data voltage to a first node N1 corresponding to a gate node of the driving transistor DRT; and a storage capacitor Cst that maintains data voltage corresponding to image signal voltage, or a corresponding voltage thereof during one frame time interval.

The organic light emitting diode OLED may include a first electrode (e.g. an anode electrode or a cathode electrode), an organic layer, and a second electrode (e.g. a cathode electrode or an anode electrode).

A base voltage EVSS may be applied to the second electrode of the organic light emitting diode OLED.

The driving transistor DRT may drive the organic light emitting diode OLED by supplying a driving current to the organic light emitting diode OLED.

The driving transistor DRT has the first node N1, a second node N2, and a third node N3.

The first node N1 of the driving transistor DRT corresponds to a gate node and may be electrically connected to a source node or a drain node of the first transistor T1.

The second node N2 of the driving transistor DRT may be electrically connected to the first electrode of the organic light emitting diode OLED, and may be a source node or a drain node.

The third node N3 of the driving transistor DRT is a node to which a driving voltage EVDD is applied, may be electrically connected to a driving voltage line DVL configured to supply a driving voltage EVDD, and may be a source node or a drain node.

The first transistor T1 is electrically connected between a data line DL and the first node N1 of the driving transistor DRT and may be controlled by a scan signal SCAN applied to a gate node thereof through a gate line.

The first transistor T1 may be turned on by the scan signal SCAN and then may transfer a data voltage Vdata supplied from the data line DL to the first node N1 of the driving transistor DRT.

The storage capacitor Cst may be electrically connected between the first node N1 and the second node N2 of the driving transistor DRT.

The storage capacitor Cst is an intentionally designed external capacitor outside the driving transistor DRT rather than a parasitic capacitor (e.g, Cgs or Cgd) corresponding to an internal capacitor existing between the second node N2 and the first node N1 of the driving transistor DRT.

As shown in FIG. 5, each subpixel may further include a second transistor T2 in order to control the voltage of the second node N2 of the driving transistor DRT or sense subpixel characteristics (e.g. the threshold voltage or mobility of the driving transistor DRT, the threshold voltage of the organic light emitting diode OLED, etc.).

The second transistor T2 is electrically connected between the second node NE of the driving transistor DRT and a reference voltage line RVL configured to supply a reference voltage Vref, and may be controlled by a sensing signal SENSE, which may be a scan signal, applied to a gate node thereof.

The second transistor T2 is turned on by the sensing signal SENSE and then applies the reference voltage Vref supplied through the reference voltage line RVL to the second node N2 of the driving transistor DRT.

In addition, the second transistor T2 may be utilized as one among voltage sensing paths with respect to the second node N2 of the driving transistor DRT.

A scan signal SCAN and a sensing signal SENSE may be separate gate signals. In this case, the scan signal SCAN and the sensing signal SENSE may be respectively applied to the gate node of the first transistor T1 and the gate node of the second transistor T2 through respective different gate lines.

According to the circumstances, a scan signal SCAN and a sensing signal SENSE may be the same gate signal. In this case, the scan signal SCAN and the sensing signal SENSE may be commonly applied to the gate node of the first transistor T1 and the gate node of the second transistor T2 through the same gate lines.

Each of the driving transistor DRT, the first transistor T1, and the second transistor T2 may be an n-type transistor or a p-type transistor.

Figure 6:
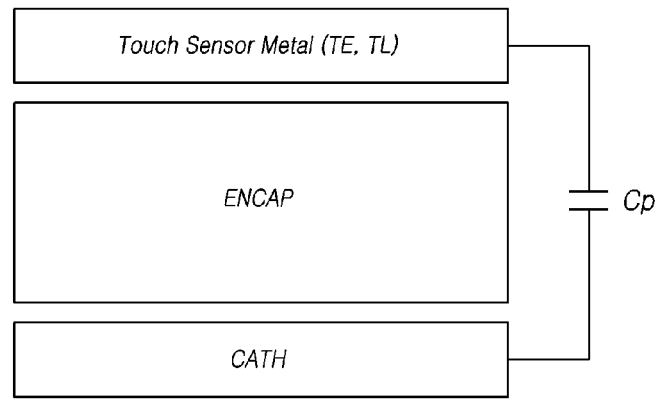
FIG. 6 is a diagram showing parasitic capacitance occurring under a structure in which metal touch sensors are located on an encapsulation layer in the touch display device according to the present disclosure.

FIG. 6 is a diagram showing parasitic capacitance occurring under a structure in which touch sensor metal TE and TL are located on an encapsulation layer ENCAP in the touch display device 100 according to the present disclosure.

Referring to FIG. 6, the touch sensor metal TE and TL including the touch electrodes TE, the touch lines TL, etc. may be arranged on an encapsulation layer ENCAP in the touch display device 100 according to the present disclosure.

As described above, the structure in which the touch sensor metal TE and TL are located on the encapsulation layer ENCAP is called a Touch On Encapsulation layer structure (TOE structure).

Also, a cathode CATH corresponding to the second electrode of the organic light emitting diode OLED may exist at the lower part of the encapsulation layer ENCAP.

A base voltage EVSS may be applied to the cathode CATH.

Specifically, in the TOE structure, the touch panel TSP may be mounted inside the display panel 110, the display panel 110 including the touch panel TSP mounted therein may include the cathode CATH and the encapsulation layer ENCAP located on the cathode CATH, and a metal touch sensor including the plurality of touch electrodes TE and the plurality of touch lines TL may be located on the encapsulation layer ENCAP.

According to the TOE structure, the touch panel TSP may be efficiently mounted inside the display panel 110 corresponding to the organic light emitting panel.

The encapsulation layer ENCAP may be a composite layer consisting of multiple layers including an organic material, an inorganic material, etc.

The encapsulation layer ENCAP may be an insulating layer.

Accordingly, the encapsulation layer ENCAP existing between the cathode CATH to which a base voltage EVSS is applied and the metal touch sensor TE and TL to which a predetermined voltage is applied by a touch driving signal, etc. may act as a dielectric material, so that capacitance Cp may occur between the touch sensor metal TE and TL and the cathode CATH.

Capacitance Cp incurred between the touch sensor metal TE and TL and the cathode CATH corresponds to an unnecessary parasitic capacitance, not capacitance required for touch sensing.

Therefore, when capacitance Cp occurs between the touch sensor metal TE and TL and the cathode CATH, touch sensitivity may be significantly degraded.

The difference of the parasitic capacitances Cp of touch channels (driving channel, sensing channel) may be large depending on a length difference between the touch lines TL.

That is, a length difference between the touch lines TL may generate a large difference in the parasitic capacitance Cp between the metal touch sensor TE and TL and the cathode CATH, for each touch channel (driving channel, sensing channel).

Therefore, the difference of touch sensitivities for respective touch channels (driving channel, sensing channel) occurs thereby significantly degrading a touch sensing performance.

The problem resulting from a length difference between touch lines TL will be described with reference to FIGS. 7 and 8.

Figure 7:
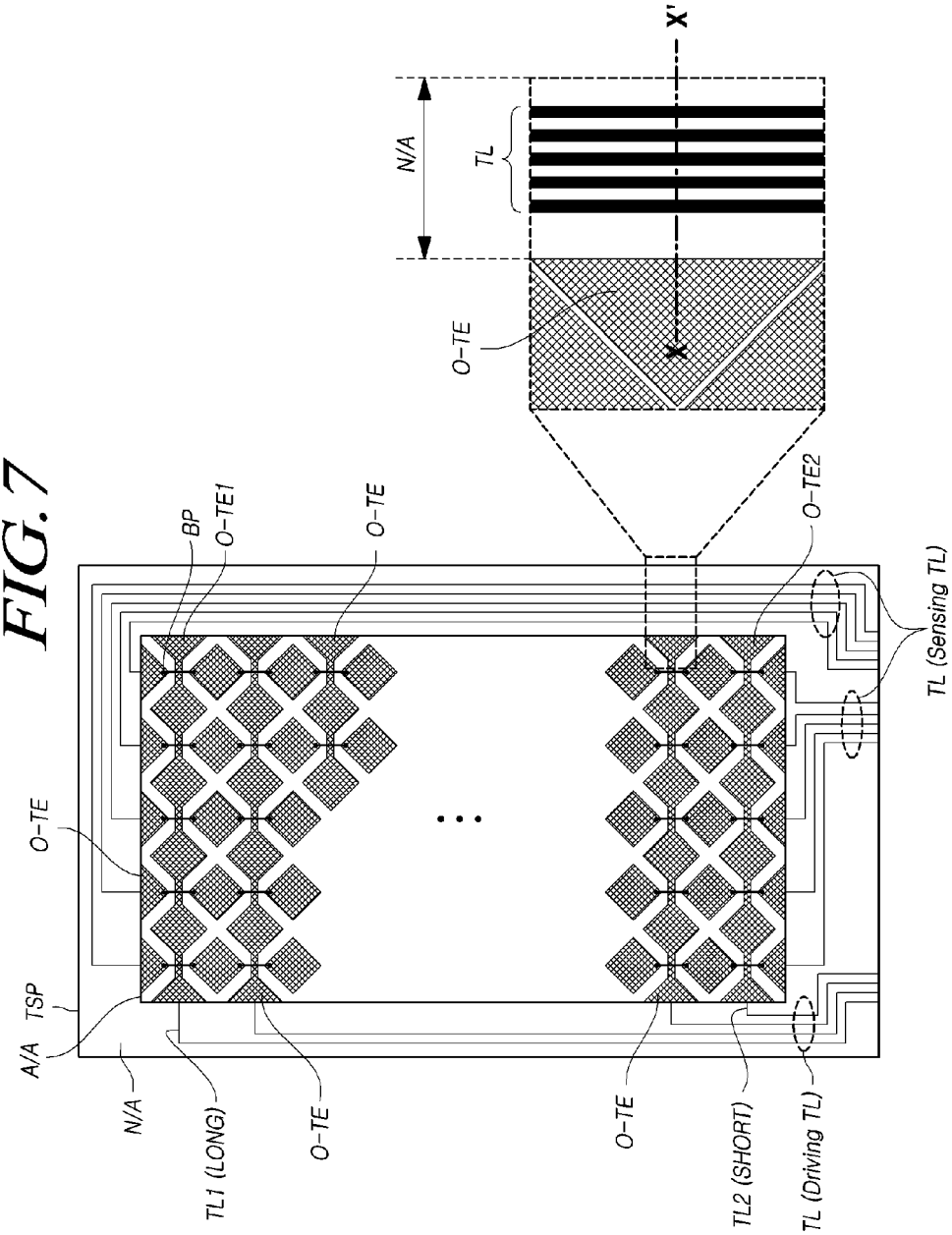
FIGS. 7 and 8 are a plan view and a cross-sectional view showing the outermost peripheral touch electrode and the peripheral area thereof, respectively, in the touch display device according to the present disclosure.
Figure 8:
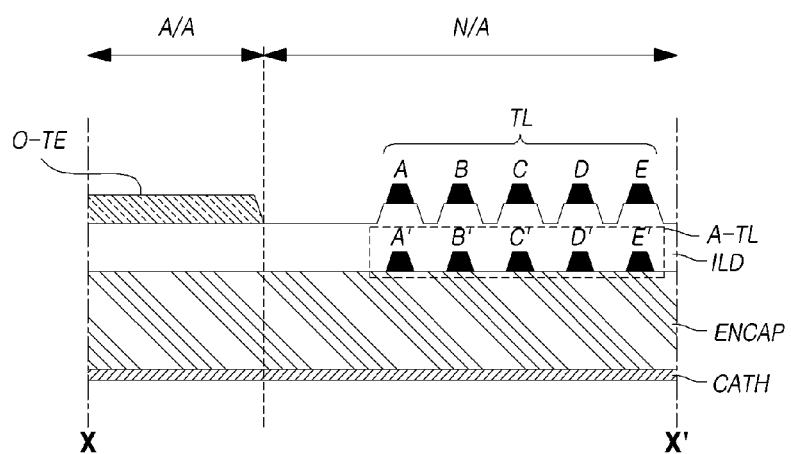

FIGS. 7 and 8 are a plan view and a cross-sectional view showing the outermost peripheral touch electrode 0-TE and the peripheral area thereof, respectively, in the touch display device 100 according to present disclosure.

Referring to FIG. 7, outermost peripheral touch electrodes 0-TE arranged at the outermost peripheral region exist among the plurality of touch electrodes TE.

The outermost peripheral touch electrodes 0-TE may have a size smaller than that of a touch electrode TE existing in the inner region.

In the case of the example of FIG. 7, the size of the outermost peripheral touch electrodes 0-TE corresponds to a half of the size of a touch electrode TE which has a diamond shape and exists in the inner region.

All or some of the outermost peripheral touch electrodes 0-TE are electrically connected to the touch lines TL.

One or more touch lines TL may be connected to each driving touch electrode line. One or more touch lines TL may be connected to each sensing touch electrode line.

In an example of FIG. 7, one driving touch electrode line is disposed in a row direction and in the same row, includes a plurality of touch electrodes TE electrically and integrally connected, and is connected with one touch line TL.

The outeroutermost peripheral touch electrode 0-TE disposed at one side among the plurality of touch electrodes TE included in the one driving touch electrode line is connected to one touch line TL.

In an example of FIG. 7, one sensing touch electrode line is disposed in a column direction and in the same column, includes a plurality of touch electrodes TE electrically connected by a bridge BP, and is connected with two touch line TL.

Each of the outermost peripheral touch electrodes 0-TE disposed at both sides among the plurality of touch electrodes TE included in the one sensing touch electrode line is connected to a touch line TL.

Referring to FIG. 7, a plurality of touch electrodes TE may exist in an active area A/A. A plurality of touch lines TL may exist in a non-active area N/A.

FIG. 8 is a XX' cross-sectional view of the enlarged part of an area in which one outeroutermost peripheral touch electrode 0-TE exists and the peripheral area thereof as illustrated in FIG. 7.

Referring to FIG. 8, the encapsulation layer ENCAP is located on the cathode CATH.

An insulating layer ILD is located on the encapsulation layer ENCAP.

The outermost peripheral touch electrode 0-TE and touch lines TL (A, B, C, D, and E) exist on the insulating layer ILD.

The outermost peripheral touch electrode 0-TE exists in an active area A/A, and the touch lines TL (A, B, C, D, and E) exist in a non-active area N/A.

Auxiliary touch lines A-TL (A', B', C', D', and E') corresponding to the touch lines TL (A, B, C, D, and E) are located on the encapsulation layer ENCAP and are located in the insulating layer ILD.

As shown in FIG. 8, the five touch lines TL (A, B, C, D, and E) are separated from the five auxiliary touch lines A-TL (A', B', C', D', and E') by the insulating layer ILD.

However, the five touch lines TL (A, B, C, D, and E) are electrically connected to the five auxiliary touch lines A-TL (A', B', C', D', and E') at a point where the five touch lines TL (A, B, C, D, and E) are connected to the touch circuit 130 or at a point where the five touch lines TL (A, B, C, D, and E) are connected to five outermost peripheral touch electrodes 0-TE.

A double wiring structure using the five touch lines TL (A, B, C, D, and E) and the five auxiliary touch lines A-TL (A', B', C', D', and E') may enable a signal to be stably transferred.

Referring back to FIG. 7, when the touch circuit 130 exists in a lower end part (the location where touch lines are gathered), a plurality of touch lines TL may have different lengths depending on the locations of the outermost peripheral touch electrodes 0-TE correspondingly connected to the touch lines TL.

For example, a first outermost peripheral touch electrode 0-TE1 is electrically connected to a first touch line TL1, and a second outermost peripheral touch electrode 0-TE2 is electrically connected to a second touch line TL2.

The first touch line TL1 is longer than the second touch line TL2.

Accordingly, the parasitic capacitance Cp incurred between the cathode and a metal touch sensor relating to the first touch line TL1 is greater than the parasitic capacitance Cp incurred between the cathode and a metal touch sensor relating to the second touch line TL2.

The touch sensor metal relating to the first touch line TL1 includes the first touch line TL1, and touch electrodes (driving touch electrodes, in the case of FIG. 7) configuring a touch electrode line (a driving touch electrode line, in the case of FIG. 7) electrically connected to the first touch line TL1.

The touch sensor metal relating to the second touch line TL2 includes the second touch line TL2, and touch electrodes (driving touch electrodes, in the case of FIG. 7) configuring a touch electrode line (a driving touch electrode line, in the case of FIG. 7) electrically connected to the second touch line TL2.

The difference of parasitic capacitances Cp due to the difference of touch line lengths as described above may incur an error of a touch sensing result.

The present disclosure may provide a parasitic capacitance difference reducing structure.

A parasitic capacitance difference reducing structure in the present disclosure may exist in a non-active area N/A or in an active area A/A.

In the following description, a parasitic capacitance difference reducing structure in a non-active area N/A will be firstly explained, and, next, a parasitic capacitance difference reducing structure in an active area A/A will be explained.

Figure 9:
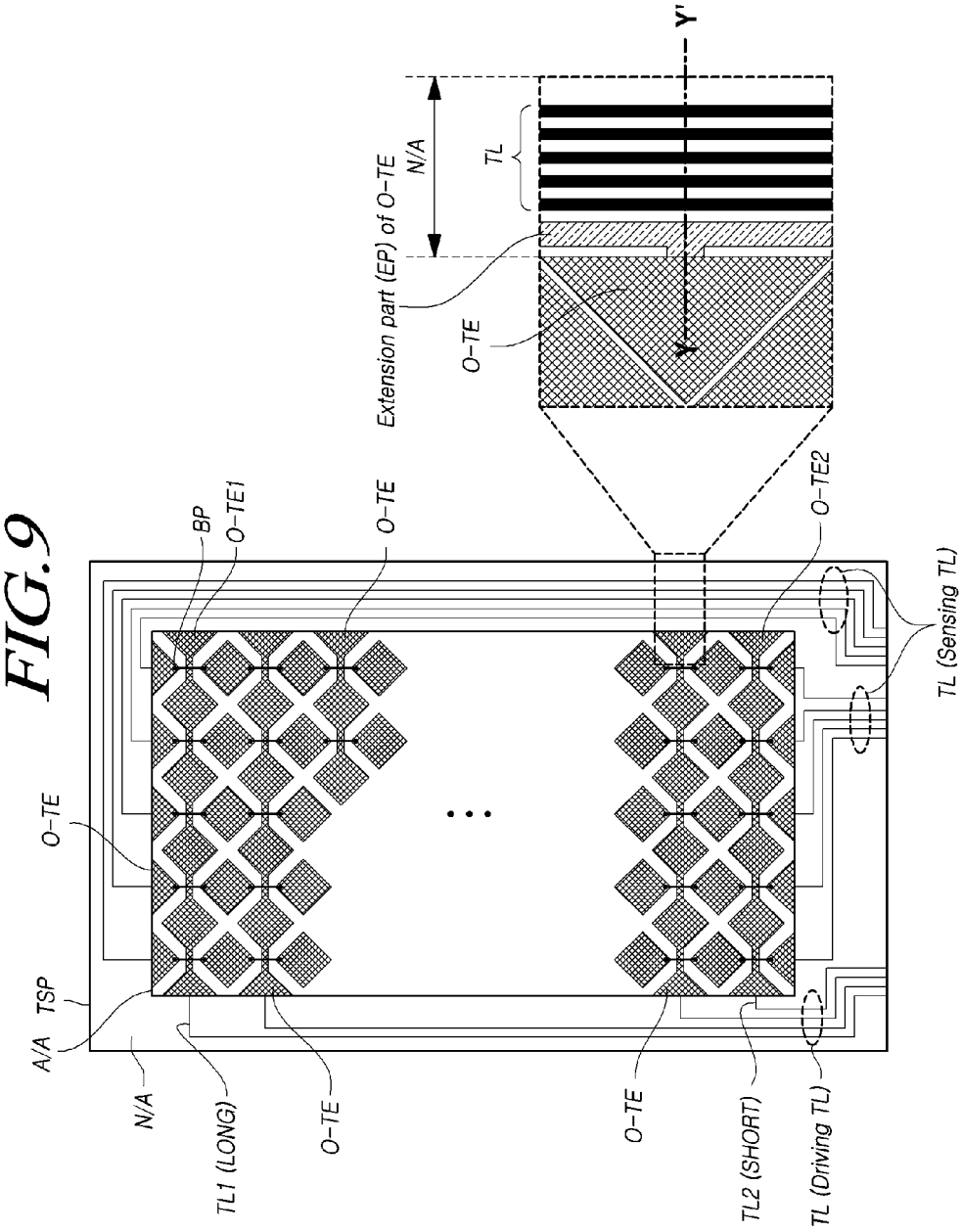
FIGS. 9 and 10 are a plan view and a cross-sectional view for illustrating a parasitic capacitance difference reducing structure in a non-active area in the touch display device according to the present disclosure.
Figure 10:
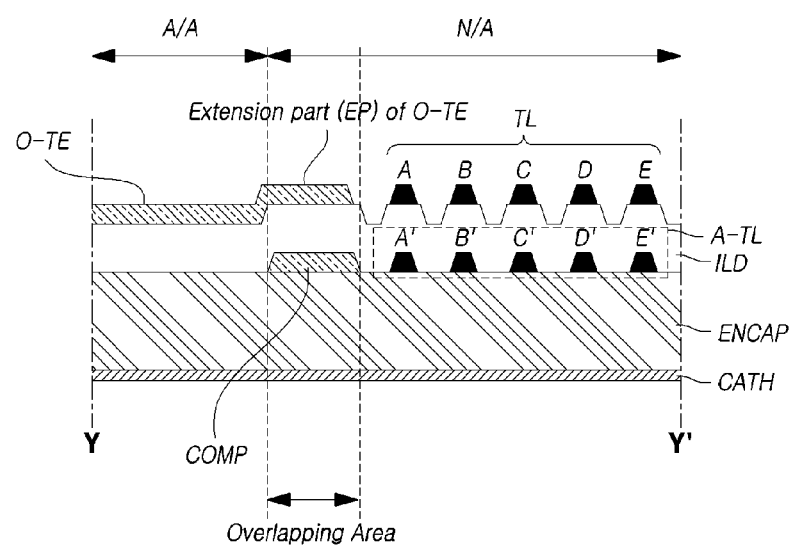
Figure 11:
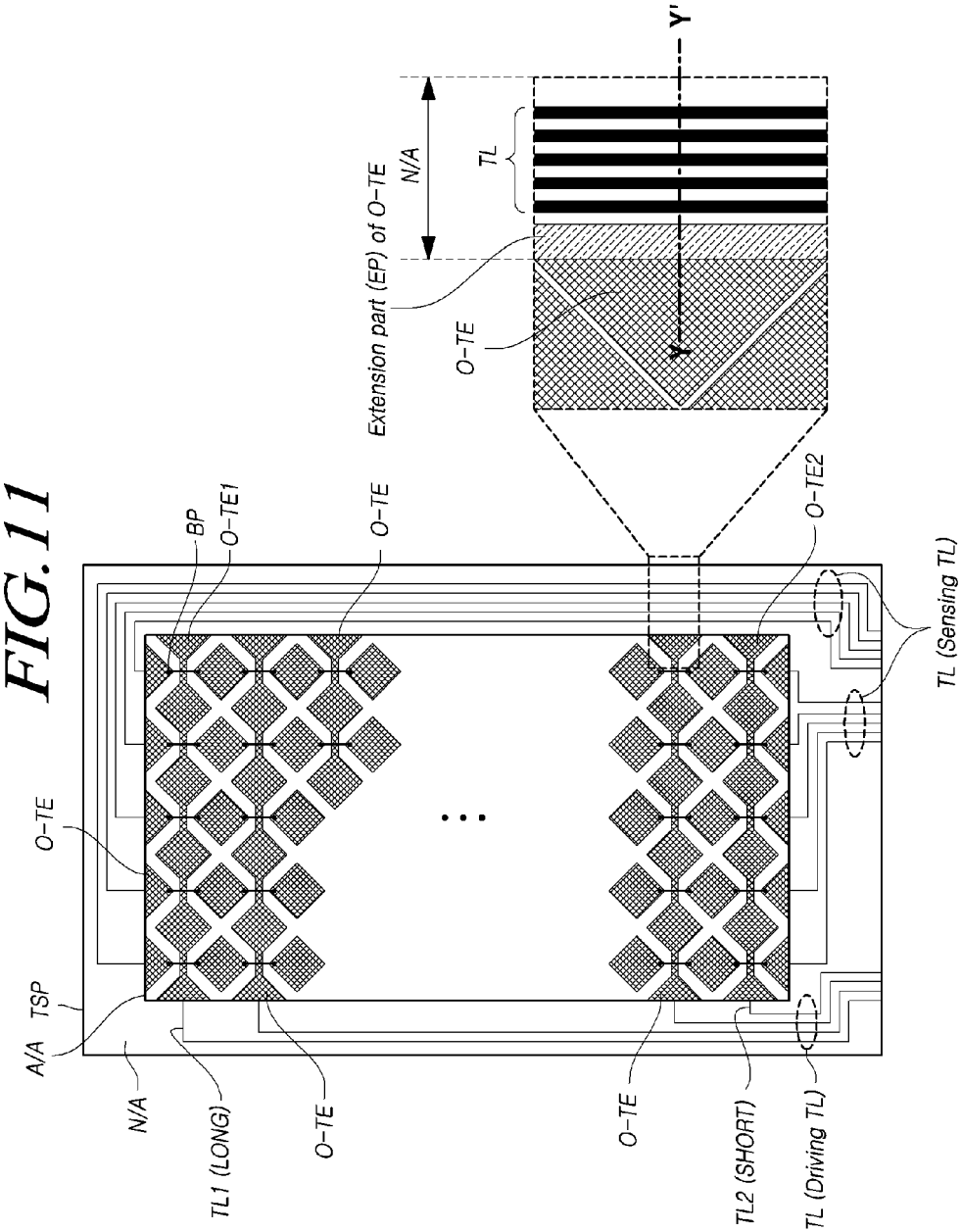
FIG. 11 is a view showing a modification of the extended part of the outermost peripheral touch electrode, when the structure in a non-active area is changed to reduce a parasitic capacitance difference, in the touch display device according to present disclosure.

FIGS. 9 and 10 are a plan view and a cross-sectional view for illustrating a parasitic capacitance difference reducing structure in a non-active area N/A in the touch display device 100 according to the present disclosures. FIG. 11 is a view showing the modification of the extended part of the outermost peripheral touch electrode 0-TE, when the structure in a non-active area N/A is changed to reduce a parasitic capacitance difference, in the touch display device 100 according to the present disclosure.

Referring to FIGS. 9 and 10, the touch display device 100 according to the present disclosure may reduce a parasitic capacitance difference through the change of the structure in a non-active area N/A.

That is, the touch display device 100 according to the present disclosure may have a parasitic capacitance difference reducing structure in a non-active area N/A.

As illustrated in FIG. 10, in the touch display device 100 according to the present disclosure, the touch panel TSP may further include, as a parasitic capacitance difference reducing structure in a non-active area N/A, a capacity compensation pattern COMP that overlaps a partial area of at least one outermost peripheral touch electrode 0-TE among the uttermost peripheral touch electrodes 0-TE disposed at the outermost peripheral region among the plurality of touch electrodes TE.

In the touch display device 100 according to the present disclosure, an extension part EP of the outermost peripheral touch electrode 0-TE extended up to a non-active area N/A may be further included as a parasitic capacitance difference reducing structure in the non-active area N/A.

The extension part EP of the outermost peripheral touch electrode 0-TE extended up to a non-active area N/A may be located to correspond to the capacity compensation pattern COMP which is in the non-active area N/A.

That is, in the non-active area N/A, the extension part EP of the outeroutermost peripheral touch electrode 0-TE overlaps the capacity compensation pattern COMP.

In the non-active area N/A, the extension part EP of the outermost peripheral touch electrode 0-TE and the capacity compensation pattern COMP may incur a capacitance therebetween.

In the following description, the capacitance incurred between the extension part EP of the outermost peripheral touch electrode 0-TE and the capacity compensation pattern COMP is called a compensation capacitance.

The magnitude of a compensation capacitance may vary depending on the size of an overlapping area between the extension part EP of the outermost peripheral touch electrode 0-TE and the capacity compensation pattern COMP.

When the size of an overlapping area between the extension part EP of the outermost peripheral touch electrode 0-TE and the capacity compensation pattern COMP is increased, the magnitude of a compensation capacitance may be increased. When the size of an overlapping area between the extension part EP of the outermost peripheral touch electrode 0-TE and the capacity compensation pattern COMP is decreased, the magnitude of a compensation capacitance may be decreased.

In the non-active area N/A, a compensation capacitance incurred between the extension part EP of the outermost peripheral touch electrode 0-TE and the capacity compensation pattern COMP corresponds to an purposely made capacitance, may vary depending on the outermost peripheral touch electrodes 0-TE, and is a capacitance that compensates for a parasitic capacitance difference according to a touch line length difference.

Therefore, the size of an overlapping area between the extension part EP of the outermost peripheral touch electrode 0-TE and the capacity compensation pattern COMP is variously designed to compensate for the difference of parasitic capacitances Cp that occurs due to the difference of the lengths of touch lines TL electrically and respectively connected to the outermost peripheral touch electrodes 0-TE. Accordingly, a compensation capacitance between the extension part EP of the outermost peripheral touch electrode 0-TE and the capacity compensation pattern COMP may vary, so that a parasitic capacitance difference may be compensated for.

When a parasitic capacitance Cp is large because the length of a touch line TL is short, an overlapping area between an extension part EP of the outermost peripheral touch electrode 0-TE electrically connected to the touch line TP having a short length and a capacity compensation pattern COMP is designed to have a small size, so that a compensation capacitance is designed to have a small magnitude.

When a parasitic capacitance Cp is small because the length of a touch line TL is long, an overlapping area between an extension part EP of the outermost peripheral touch electrode 0-TE electrically connected to the touch line TP having a long length and a capacity compensation pattern COMP is designed to have a large size, so that a compensation capacitance is designed to have a large magnitude.

As described above, the outermost peripheral touch electrode TE is extended to be in a non-active area N/A, a capacity compensation pattern COMP overlapping the extension part EP is additionally arranged, and the size of an overlapping area between the extension part EP of the outermost peripheral touch electrode 0-TE and the capacity compensation pattern COMP is variously designed. Accordingly, a parasitic capacitance difference occurring due to a length difference between touch lines TL may be removed or reduced.

As described above, a capacity compensation pattern COMP is located to correspond to the non-active area N/A which is the outside area of the active area A/A.

A part in which at least one outermost peripheral touch electrode 0-TE does not overlap the capacity compensation pattern COMP is located to correspond to the active area A/A, and a part in which at least one outermost peripheral touch electrode 0-TE overlaps the capacity compensation pattern COMP is located to correspond to the non-active area N/A.

A parasitic capacitance difference occurring due to a length difference between touch lines TL may be compensated for in a non-active area N/A.

Referring to FIG. 10, when the touch panel TSP is mounted inside the display panel 110, the display panel 110 including the touch panel TSP mounted therein may include the cathode CATH, the encapsulation layer ENCAP located on the cathode CATH, and the insulating layer ILD located on the encapsulation layer ENCAP.

A touch sensor metal including a plurality of touch electrodes TE and a plurality of touch lines TL is located on the insulating layer ILD.

The capacity compensation pattern COMP is located between the encapsulation layer ENCAP and the insulating layer ILD.

According to the cross-sectional structure as described above, under the TOE structure, a parasitic capacitance reducing structure may be efficiently made in a non-active area N/A.

As shown in FIG. 10, the five touch lines TL (A, B, C, D, and E) are separated from the five auxiliary touch lines A-TL (A', B', C', D', and E') by the insulating layer ILD.

However, the five touch lines TL (A, B, C, D, and E) are electrically connected to the five auxiliary touch lines A-TL (A', B', C', D', and E') at a point where the five touch lines TL (A, B, C, D, and E) are connected to the touch circuit 130 or at a point where the five touch lines TL (A, B, C, D, and E) are connected to five outermost peripheral touch electrodes 0-TE.

A double wiring structure using the five touch lines TL (A, B, C, D, and E) and the five auxiliary touch lines A-TL (A', B', C', D', and E') may enable a signal to be stably transferred.

Referring to FIG. 9, the extension part EP of the outermost peripheral touch electrode 0-TE may be configured by a metal electrode EM, instead of having a mesh shape.

Figure 18:
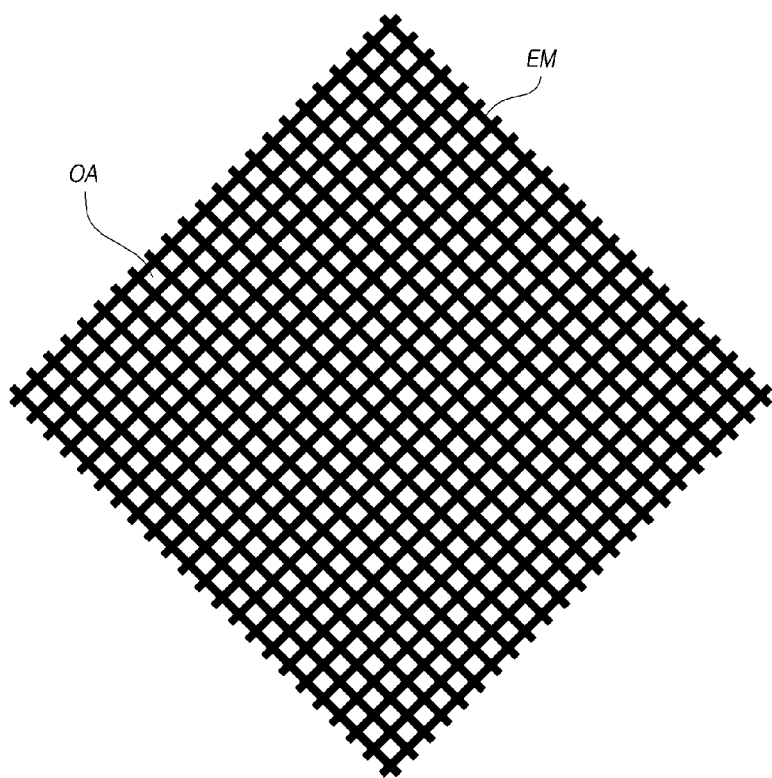
FIG. 18 is a diagram showing a mesh-type touch electrode, in the touch display device according to the present disclosure.

That is, the extension part EP of the outermost peripheral touch electrode 0-TE may not have holes OA (shown in FIG. 18).

Referring to FIG. 9, the extension part EP of the outermost peripheral touch electrode 0-TE extended to the non-active area N/A may be narrowly connected to a part thereof in the active area A/A.

That is, the extension part EP of the outermost peripheral touch electrode 0-TE extended to the non-active area N/A and the part thereof in the active area A/A may be partially connected to each other.

As shown in FIG. 11, the extension part EP of the outermost peripheral touch electrode 0-TE extended to the non-active area N/A and the part thereof in the active area A/A may be entirely connected to each other.

That is, the entirety of the part of the outermost peripheral touch electrode 0-TE in the active area A/A may be extended to the non-active area N/A.

Figure 12:
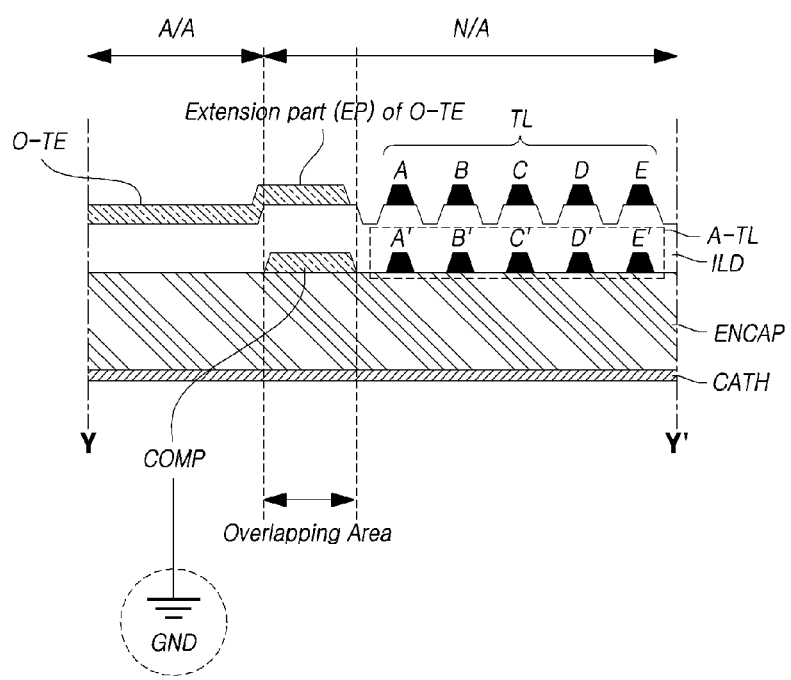
FIG. 12 is a view showing the case where a capacity compensation pattern overlapping an extension part of the outermost peripheral touch electrode corresponds to a ground pattern according to a modified structure in a non-active area for reducing a parasitic capacitance difference, in the touch display device according to the present disclosure.

FIG. 12 is a view showing the case where a capacity compensation pattern COMP overlapping an extension part EP of the outermost peripheral touch electrode 0-TE corresponds to a ground pattern according to a modified structure in a non-active area N/A for reducing a parasitic capacitance difference, in the touch display device 100 according to the present disclosure.

Referring to FIG. 12, the capacity compensation pattern COMP overlapping an extension part EP of the outermost peripheral touch electrode 0-TE may be a ground pattern to which a ground voltage GND is applied. Alternatively, the capacity compensation pattern COMP may be a pattern to which a voltage having a level different from that of a voltage (the voltage of a touch driving signal or a touch sensing signal), which is applied to the outermost peripheral touch electrode 0-TE (may be a driving touch electrode or a sensing touch electrode), is applied.

A base voltage applied to the cathode may be a ground voltage GND.

Therefore, a compensation capacitance for removing a parasitic capacitance difference may be efficiently incurred. When a capacity compensation pattern COMP is a ground voltage pattern, the capacity compensation pattern COMP may be utilized as an electrostatic discharge path in the touch panel TSP or the display panel 110.

The extension part EP of the outermost peripheral touch electrode 0-TE may exist in the non-active area N/A, and however, may exist in the active area A/A.

Therefore, a capacity compensation pattern COMP may exist in the non-active area N/A, and however, may exist in the active area A/A.

When the extension part EP of a touch electrode 0-TE exists in the non-active area N/A, the extension part EP of the outermost peripheral touch electrode 0-TE may not have a hole OA (shown in FIG. 18) corresponding to an open area. That is, the extension part EP of the outermost peripheral touch electrode 0-TE may be a metal electrode EM which is not patterned in a mesh shape.

In the following description, the parasitic capacitance difference reducing structure in the non-active area N/A as described above will be explained in the case of removing a parasitic capacitance difference occurring due to the length difference between the first touch line TL1 electrically connected to the first outermost peripheral touch electrode 0-TE1 and the second touch line TL2 electrically connected to the second outermost peripheral touch electrode 0-TE2 as shown in FIG. 7.

A capacity compensation pattern COMP existing in the non-active area N/A overlaps a partial area of the first outermost peripheral touch electrode 0-TE1 and a partial area of the second outermost peripheral touch electrode 0-TE2.

The size (area) of an overlapping area between the first outermost peripheral touch electrode 0-TE1 and the capacity compensation pattern COMP, and the size (area) of an overlapping area between the second outermost peripheral touch electrode 0-TE2 and the capacity compensation pattern COMP may be different from each other.

According to FIG. 7, the length of the first touch line TL1 electrically connected to the first outermost peripheral touch electrode 0-TE1 is longer than the length of the second touch line TL2 electrically connected to the second outermost peripheral touch electrode 0-TE2.

Therefore, when the length of the first touch line TL1 is longer than the length of the second touch line TL2, a parasitic capacitance Cp incurred between the cathode CATH and a metal touch sensor (including the first outermost peripheral touch electrode 0-TE1) relating to the first touch line TL1 is greater than a parasitic capacitance Cp incurred between the cathode CATH and a metal touch sensor (including the second outermost peripheral touch electrode 0-TE2) relating to the second touch line TL2.

Therefore, an overlapping area between the first outermost peripheral touch electrode 0-TE1 and the capacity compensation pattern COMP may be designed to have a size smaller than that of an overlapping area between the second outermost peripheral touch electrode 0-TE2 and the capacity compensation pattern COMP.

A compensation capacitance artificially incurred between the first outermost peripheral touch electrode 0-TE1 and the capacity compensation pattern COMP may be smaller than a compensation capacitance artificially incurred between the second outermost peripheral touch electrode 0-TE2 and the capacity compensation pattern COMP.

A compensation capacitance artificially incurred between the first outermost peripheral touch electrode 0-TE1 and the capacity compensation pattern COMP, and a compensation capacitance artificially incurred between the second outermost peripheral touch electrode 0-TE2 and the capacity compensation pattern COMP may have a difference therebetween corresponding to the difference between a parasitic capacitance Cp incurred between the cathode CATH and a metal touch sensor (including the first outermost peripheral touch electrode 0-TE1) relating to the first touch line TL1 and a parasitic capacitance Cp incurred between the cathode CATH and a metal touch sensor (including the second outermost peripheral touch electrode 0-TE2) relating to the second touch line TL2.

Therefore, the difference of a parasitic capacitance Cp incurred between the cathode CATH and a metal touch sensor (including the first outermost peripheral touch electrode 0-TE1) relating to the first touch line TL1 and a parasitic capacitance Cp incurred between the cathode CATH and a metal touch sensor (including the second outermost peripheral touch electrode 0-TE2) relating to the second touch line TL2 may be removed.

In the following description, two methods (structures) for controlling the size of an overlapping area in which an extension part EP of the outermost peripheral touch electrode 0-TE and a capacity compensation pattern COMP overlap with each other will be explained.

In a first method, the size of an overlapping area in which an extension part EP of a outermost peripheral touch electrode 0-TE and a capacity compensation pattern COMP overlap with each other may be controlled by controlling of the size of the extension part EP of the outermost peripheral touch electrode 0-TE.

In a second method, the size of an overlapping area in which an extension part EP of the outermost peripheral touch electrode 0-TE and a capacity compensation pattern COMP overlap with each other may be controlled by controlling of the size of the capacity compensation pattern COMP.

Firstly, the first method will be described with reference to FIGS. 13 and 14, and subsequently, the second method will be described with reference to FIGS. 15 and 16.

Figure 13:
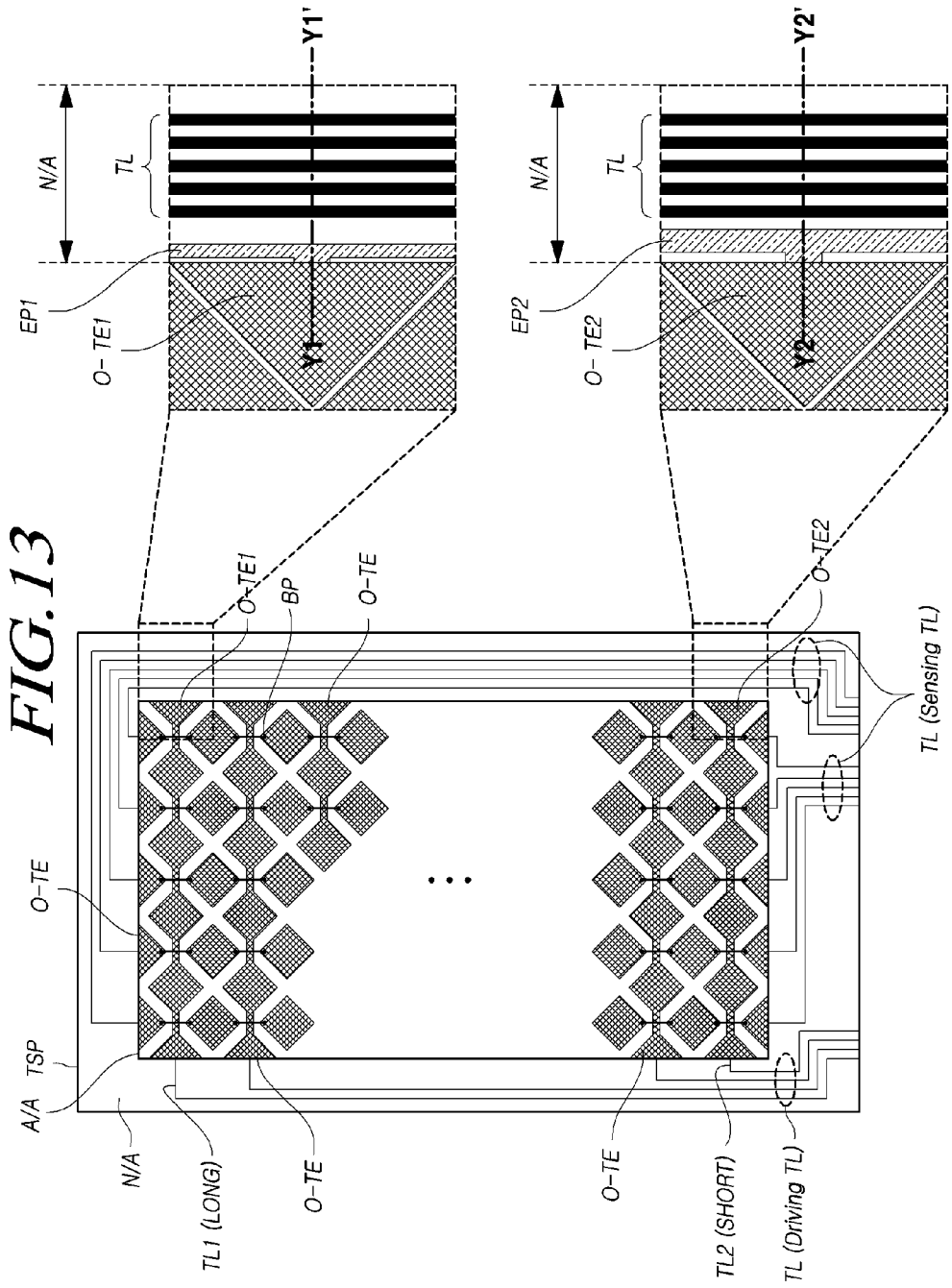
FIGS. 13 and 14 are a plan view and a sectional view showing a structure modifying scheme in a non-active area, which uses a size control of an extension part of a outermost peripheral touch electrode in order to reduce a parasitic capacitance difference, in the touch display device according to the present disclosure.
Figure 14:
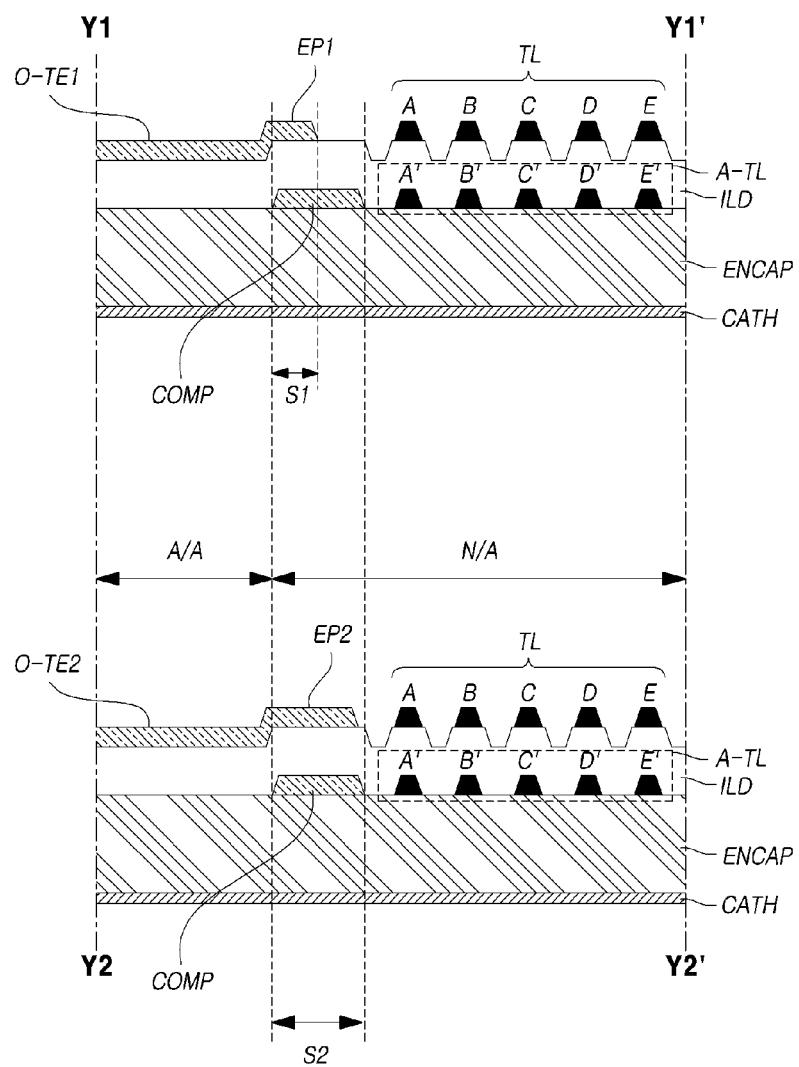

FIGS. 13 and 14 are a plan view and a sectional view showing a structure modifying scheme in a non-active area N/A, which uses a size control of an extension part EP of the outermost peripheral touch electrode 0-TE in order to reduce a parasitic capacitance difference, in the touch display device 100 according to the present disclosure.

Referring to FIGS. 13 and 14, an area in which the first outermost peripheral touch electrode 0-TE1 overlaps the capacity compensation pattern COMP may be designed to have a size smaller than that of an area in which the second outermost peripheral touch electrode 0-TE2 overlaps the capacity compensation pattern COMP.

The size of an extension part EP1 of the first outermost peripheral touch electrode 0-TE1 extended to the non-active area N/A may be designed to be smaller than the size of an extension part EP2 of the second outermost peripheral touch electrode 0-TE2 extended to the non-active area N/A.

Therefore, the size S1 of an overlapping area between the first outermost peripheral touch electrode 0-TE1 and the capacity compensation pattern COMP may be smaller than the size S2 of an overlapping area between the second outermost peripheral touch electrode 0-TE2 and the capacity compensation pattern COMP.

That is, the size S1 of an overlapping area between the extension part EP1 of the first outermost peripheral touch electrode 0-TE1 and the capacity compensation pattern COMP may be smaller than the size S2 of an overlapping area between the extension part EP2 of the second outermost peripheral touch electrode 0-TE2 and the capacity compensation pattern COMP.

Accordingly, a compensation capacitance incurred between the first outermost peripheral touch electrode 0-TE1 and the capacity compensation pattern COMP may be smaller than a compensation capacitance incurred between the second outermost peripheral touch electrode 0-TE2 and the capacity compensation pattern COMP.

Therefore, a parasitic capacitance difference in which a parasitic capacitance Cp between the cathode CATH and a metal touch sensor (including the first outermost peripheral touch electrode 0-TE1) relating to the first touch line TL1 is greater than a parasitic capacitance Cp between the cathode CATH and a metal touch sensor (including the second outermost peripheral touch electrode 0-TE2) relating to the second touch line TL2 may be reduced and removed.

As described above, the size of an overlapping area in which an extension part EP of a outermost peripheral touch electrode 0-TE and a capacity compensation pattern COMP overlap with each other may be controlled by controlling of the size of the extension part EP of the outermost peripheral touch electrode 0-TE, so that a parasitic capacitance difference may be reduced and removed.

In the case of the structure according to the first method, the width of the capacity compensation pattern COMP may be constant.

Figure 15:
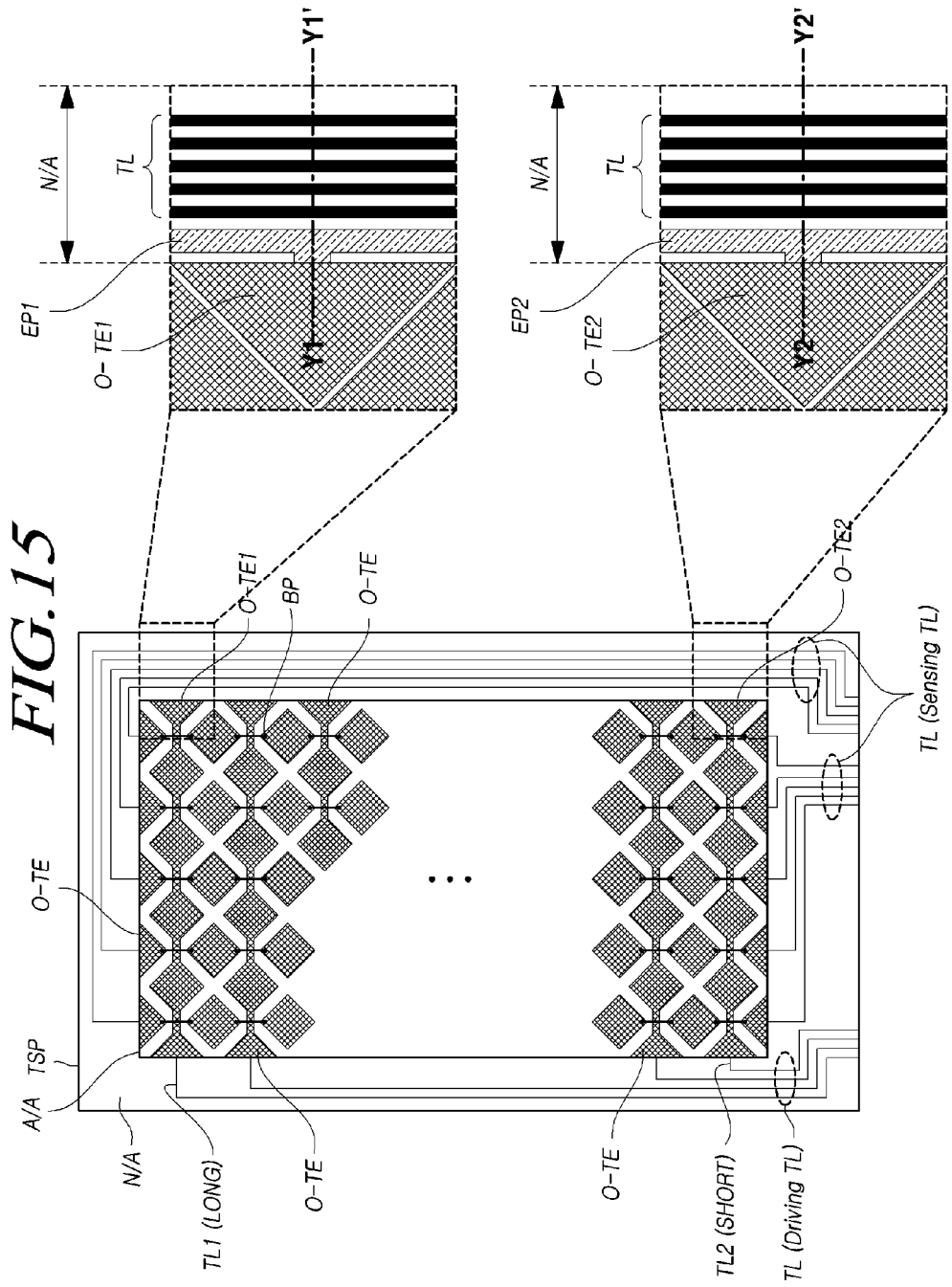
FIGS. 15 and 16 are a plan view and a sectional view showing a structure modifying scheme in a non-active area, which uses a size control of a capacity compensation pattern in order to reduce a parasitic capacitance difference, in the touch display device according to the present disclosure.
Figure 16:
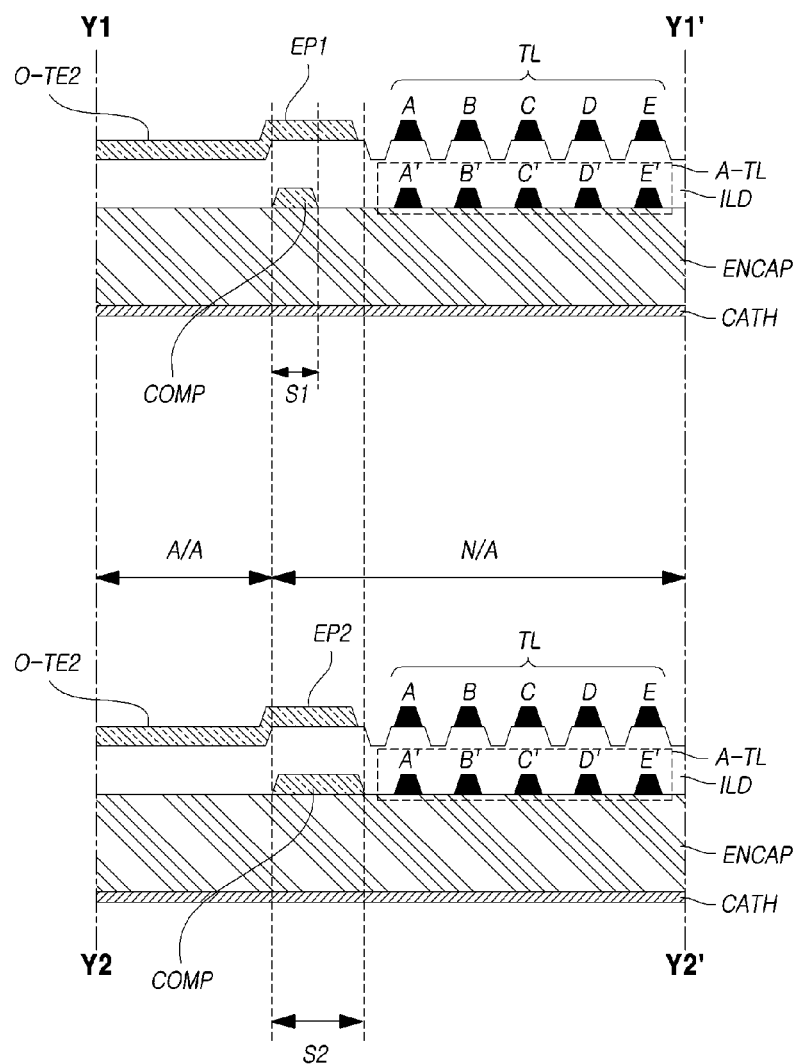

FIGS. 15 and 16 are a plan view and a sectional view showing a structure modifying scheme in a non-active area N/A, which uses a size control of a capacity compensation pattern COMP in order to reduce a parasitic capacitance difference, in the touch display device 100 according to the present disclosures.

In the capacity compensation pattern COMP, the width of the part in which the capacity compensation pattern COMP and the first outermost peripheral touch electrode 0-TE1 overlap with each other may be designed to be smaller than that of the part in which the capacity compensation pattern COMP and the second outermost peripheral touch electrode 0-TE2 overlap with each other.

Therefore, the size S1 of an overlapping area between the first outermost peripheral touch electrode 0-TE1 and the capacity compensation pattern COMP may be smaller than the size S2 of an overlapping area between the second outermost peripheral touch electrode 0-TE2 and the capacity compensation pattern COMP.

That is, the size S1 of an overlapping area between the extended part EP1 of the first outermost peripheral touch electrode 0-TE1 and the capacity compensation pattern COMP may be smaller than the size S2 of an overlapping area between the extended part EP2 of the second outermost peripheral touch electrode 0-TE2 and the capacity compensation pattern COMP.

Accordingly, a compensation capacitance incurred between the first outermost peripheral touch electrode 0-TE1 and the capacity compensation pattern COMP may be smaller than a compensation capacitance incurred between the second outermost peripheral touch electrode 0-TE2 and the capacity compensation pattern COMP.

As described above, the size of an overlapping area in which an extended part EP of a outermost peripheral touch electrode 0-TE and a capacity compensation pattern COMP overlap with each other may be controlled by controlling of the size of the capacity compensation pattern COMP. Therefore, a parasitic capacitance difference may be removed or reduced.

In the structure according to the second method, the part EP1 in which the first outermost peripheral touch electrode 0-TE1 overlaps the capacity compensation pattern COMP may be designed to have a size identical to that of the part EP2 in which the second outermost peripheral touch electrode 0-TE2 overlaps the capacity compensation pattern COMP.

That is, the extended part EP1 of the first outermost peripheral touch electrode 0-TE1 and the extended part EP2 of the second outermost peripheral touch electrode 0-TE2 may have the same size (area).

Referring to FIG. 16, in the capacity compensation pattern COMP, the part in which the capacity compensation pattern COMP and the first outermost peripheral touch electrode 0-TE1 overlap with each other may be integrated with or separated from the part in which the capacity compensation pattern COMP and the second outermost peripheral touch electrode 0-TE2 overlap with each other.

In other words, a capacity compensation pattern COMP which the first outermost peripheral touch electrode 0-TE1 overlaps and a capacity compensation pattern COMP which the second outermost peripheral touch electrode 0-TE2 overlaps may be the same electrode or different electrodes from each other.

A parasitic capacitance difference reducing structure may be adaptively designed depending on the arrangement shape of electrodes or wires in a non-active area N/A, or the concentration state of the arrangement.

Figure 17:
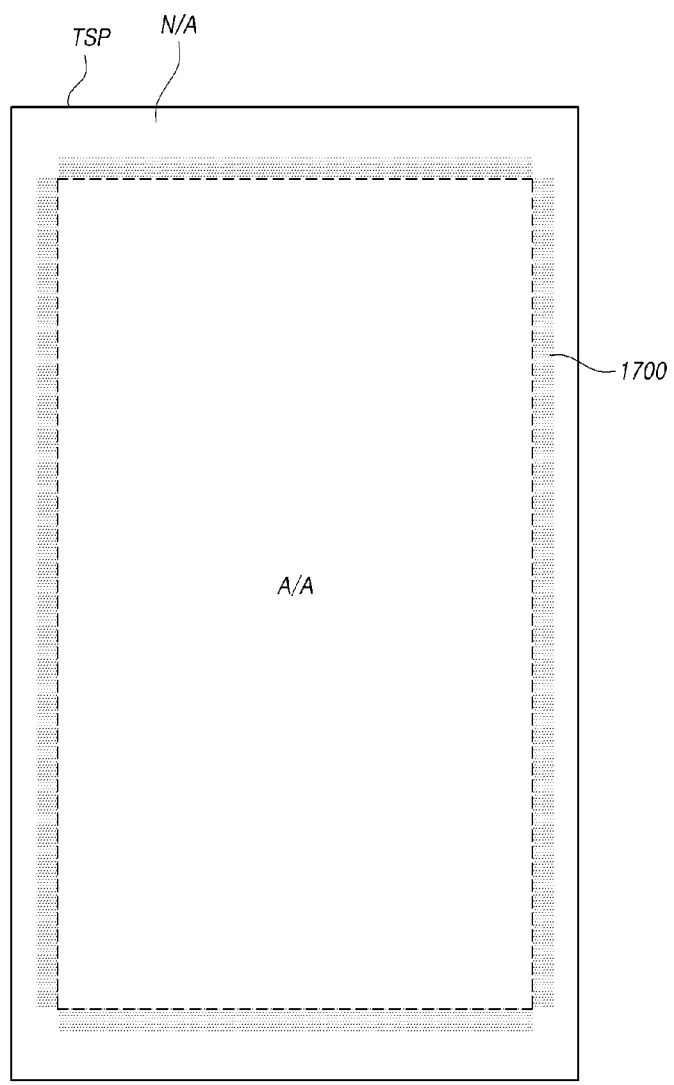
FIG. 17 is a diagram showing an area in which the structure in a non-active area N/A can be changed to reduce a parasitic capacitance difference, in the touch display device according to the aspect of the present disclosure.

FIG. 17 is a diagram showing an area 1700 in which the structure in a non-active area N/A can be changed to reduce a parasitic capacitance difference, in the touch display device 100 according to the present disclosure.

Referring to FIG. 17, the area 1700 allowing structure modification in a non-active area N/A for reducing a parasitic capacitance difference, in the touch display device 100 according to the present disclosures is an area which may exist while a capacity compensation pattern COMP overlaps an extended part EP of the outermost peripheral touch electrode 0-TE.

For example, a capacity compensation pattern COMP may exist along a second surface, a third surface, or a fourth surface of the area 1700.

When the capacity compensation pattern COMP is a ground voltage pattern, the capacity compensation pattern COMP may be utilized as an electrostatic discharge path in the touch panel TSP or the display panel 110.

FIG. 18 is a diagram showing a mesh-type touch electrode TE, in the touch display device 100 according to the present disclosure.

Referring to FIG. 18, in the touch display device 100 according to the present disclosure, each of the plurality of touch electrodes TE may be a metal electrode EM which is patterned in a mesh type and thus has holes OA therethrough. A hole OA may be referred to as an open area.

Each of holes OA in a touch electrode TE disposed by patterning a metal electrode EM in a mesh type may correspond to a light emitter of at least one subpixel.

Figure 19:
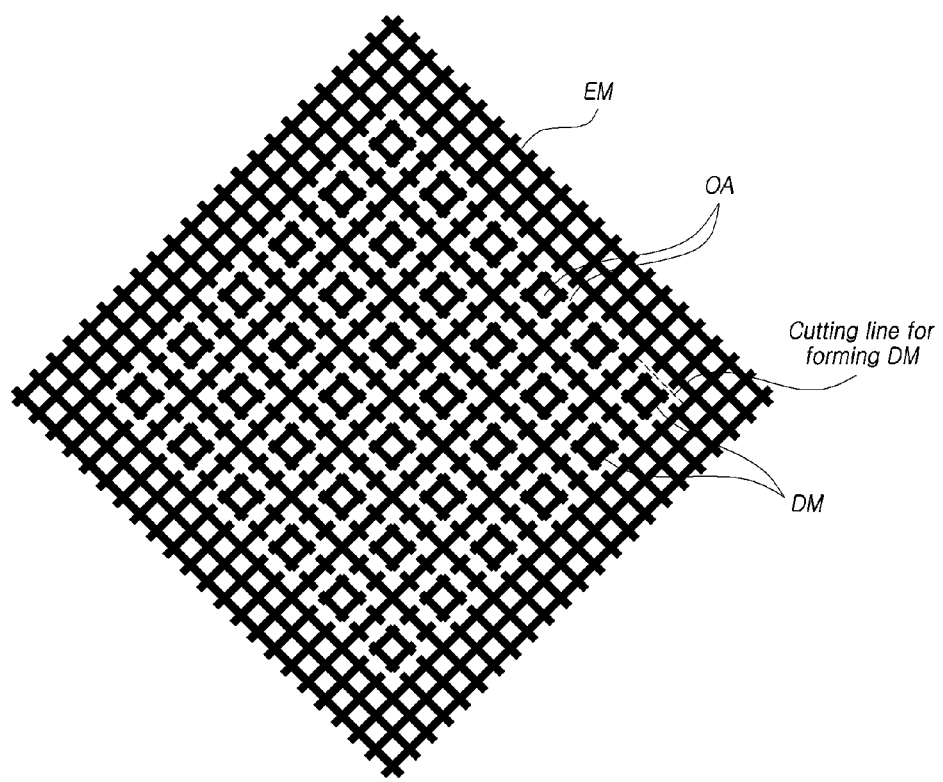
FIG. 19 is a diagram showing the case where a dummy metal exists in the area of a mesh-type touch electrode, in the touch display device according to the present disclosure.
Figure 20:
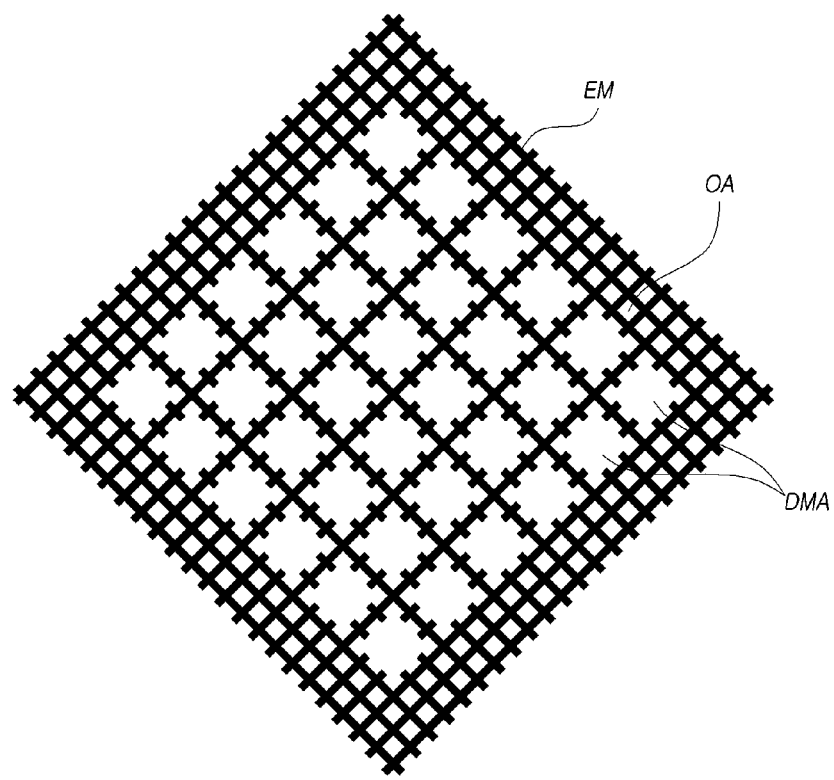
FIGS. 20 and 21 are diagrams showing a mesh-type touch electrode in which a dummy metal is omitted when the dummy metal exists in the area of the touch electrode, in the touch display device according to the present disclosure.
Figure 21:
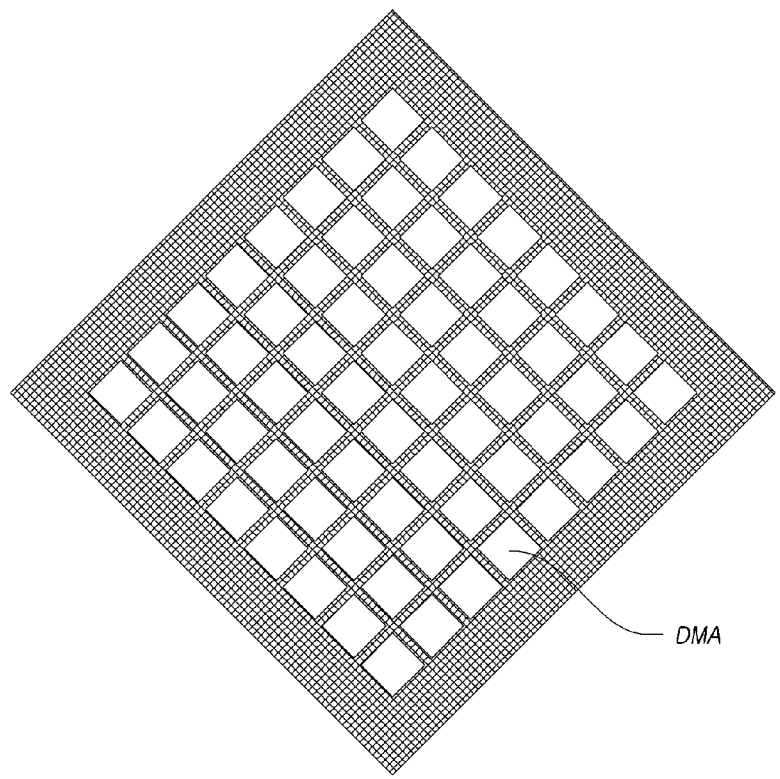

FIG. 19 is a diagram showing the case where a dummy metal DM exists in the area of a mesh-type touch electrode TE, in the touch display device 100 according to the present disclosure. FIGS. 20 and 21 are diagrams showing a mesh-type touch electrode TE in which a dummy metal DM is omitted when the dummy metal DM exists in the area of the touch electrode TE, in the touch display device 100 according to the present disclosure.

Referring to FIG. 19, in all or some of the plurality of touch electrodes TE, at least one dummy metal DM which is disconnected from a metal electrode EM may exist within its own area.

A metal electrode EM is patterned in a mesh shape, and then the metal electrode EM having been patterned in the mesh shape is cut to make a touch electrode (cutting for forming a touch electrode).

Accordingly, the metal electrode EM is patterned in the mesh shape, so that an individual touch electrode TE as shown in FIG. 18 is made. A metal electrode TE which is not cut may exist in touch electrodes TE integrated in a single touch electrode line and electrically connected as shown in FIG. 2.

Then, the metal electrode EM which has been patterned in the mesh shape in a single touch electrode area is cut in a predetermined pattern (cutting for forming a dummy metal) thereby making a dummy metal DM disconnected from the metal electrode EM.

When the dummy metal DM is arranged, the dummy metal DM corresponds to a part of the metal electrode EM, which is disconnected from the metal electrode EM.

Therefore, the metal electrode EM and the dummy metal DM may be formed of the same material and may exist in the same layer.

According to the method for forming a dummy metal DM as described above, a dummy metal DM can be easily manufactured and can be arranged together with the metal electrode EM in a single layer.

FIG. 20 illustrates a touch electrode TE in which a plurality of dummy metals DM in a single touch electrode area of FIG. 19 are omitted.

Referring to FIG. 20, a space from which the dummy metals DM are omitted is called a dummy metal area DMA.

FIGS. 19 and 20, the dummy metals DM in a single touch electrode area may be an example, and the size or the shape of a dummy metal DM in a single touch electrode area may be variously modified.

In addition, the positions at which dummy metals DM exist in a single touch electrode area may be variously modified.

In addition, a ratio (dummy metal ratio) of the size of the area, which dummy metals DM occupy, with respect to the size of a single touch electrode area may be variously modified.

FIG. 21 is a diagram further roughly illustrating the touch electrode TE of FIG. 20.

When at least one dummy metal DM does not exist in the area of a single touch electrode area TE and only a mesh-type metal electrode EM exists, a visibility problem in which the outline of the metal electrode EM is seen on a screen may occur.

However, when a dummy metal DM exists within a touch electrode area, a visibility problem which may occur in a single touch electrode TE patterned in a mesh shape may be prevented.

In addition, whether there is a dummy metal DM or the number of dummy metals (dummy metal ratio) may be adjusted for each touch electrode TE, thereby adjusting the magnitude of a capacitance for each touch electrode TE. Accordingly, touch sensitivity may be improved.

As described above, a parasitic capacitance difference reducing structure in a non-active area N/A has been explained, and, in the following description, a parasitic capacitance difference reducing structure in an active area A/A will be explained.

Figure 22:
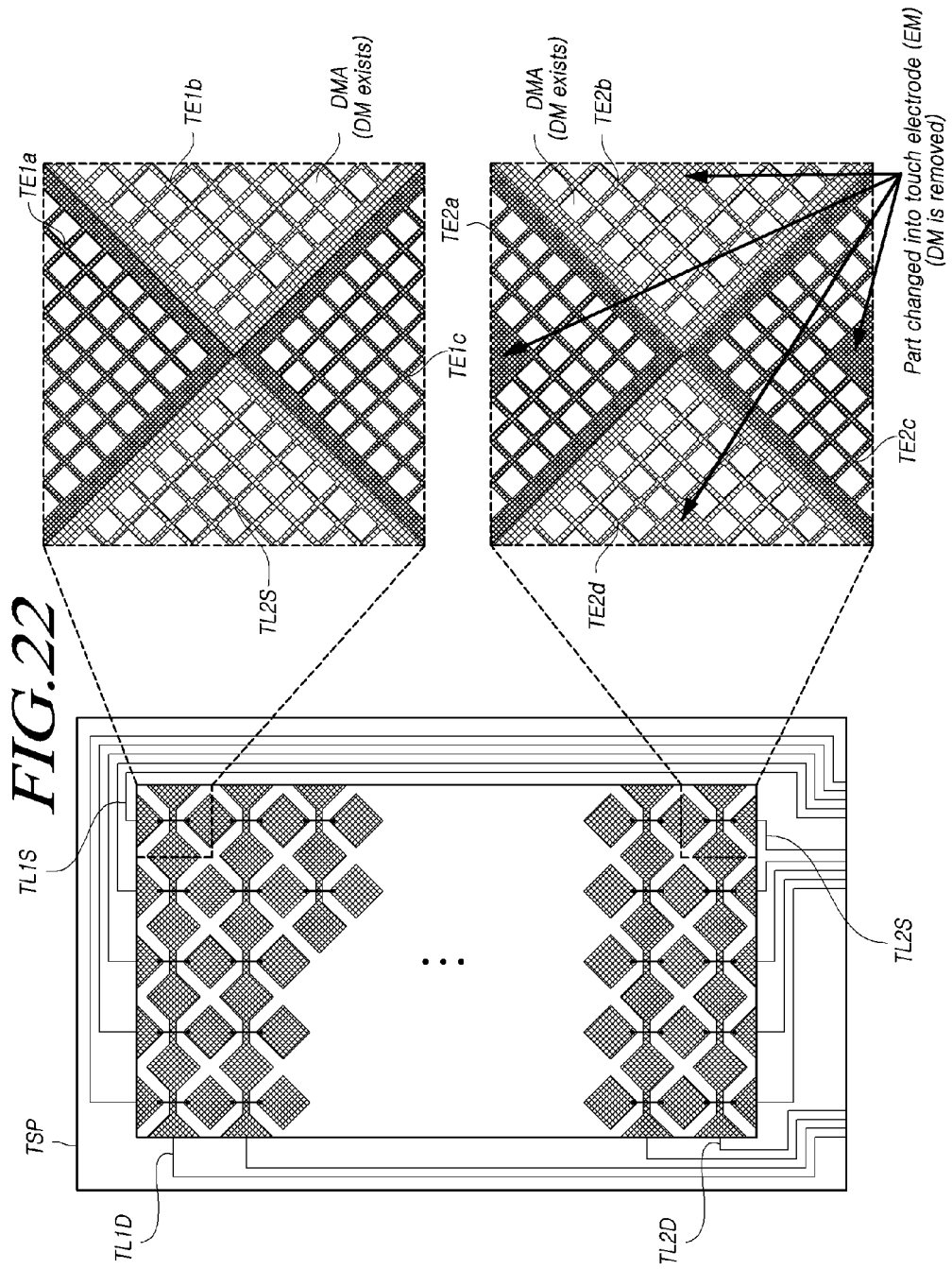
FIG. 22 is a diagram for explaining a parasitic capacitance difference reducing structure in an active area, in the touch display device according to the present disclosure.

FIG. 22 is a diagram for explaining a parasitic capacitance difference reducing structure in an active area A/A, in the touch display device 100 according to the present disclosure.

As described above, in the case where each of the plurality of touch electrodes TE may be a metal electrode EM which is patterned in a mesh type and thus has holes OA therethrough, at least one dummy metal DM disconnected from the metal electrode EM may exist in the entirety area or a partial area of the plurality of touch electrodes TE.

A parasitic capacitance difference reducing structure in an active area A/A uses a dummy metal DM which may exist in the touch electrode region of each touch electrode TE.

More particularly, the difference of parasitic capacitances Cp incurred due to the difference of the lengths of touch lines TL may be decreased by adjusting of a dummy metal ratio DMR for each touch electrode TE patterned in a mesh shape in an active area A/A.

A dummy metal ratio DMR is a ratio of the area, which all dummy metals DM occupy, to a single touch electrode area.

For example, when a plurality of touch lines TL include a first touch line TL1D or TL1S and a second touch line TL2D or TL2S which have different lengths, a ratio (dummy metal ratio, DMR) of an area, which a dummy metal DM occupies, to the area of a first touch electrode TE1a, TE1b, TE1c, or TE1d electrically connected to the first touch line TL1D or TL1S may be different from a ratio (dummy metal ratio, DMR) of an area, which a dummy metal DM occupies, to the area of a second touch electrode TE2a, TE2b, TE2c, or TE2d electrically connected to the second touch line TL2D or TL2S.

In another example, when a plurality of touch lines TL include a first touch line TL1D or TL1S and a second touch line TL2D or TL2S which have different lengths, whether a dummy metal DM exists within the area of a first touch electrode TE1a, TE1b, TE1c, or TE1d electrically connected to the first touch line TL1D or TL1S may be different from whether a dummy metal DM exists within the area of a second touch electrode TE2a, TE2b, TE2c, or TE2d electrically connected to the second touch line TL2D or TL2S.

As described above, whether a dummy metal DM exists in a touch electrode area or a dummy metal ratio DMR may be differently adjusted, thereby adjusting the difference of the parasitic capacitance for each of touch electrodes TE connected to touch lines TL having different lengths.

The case where a first touch line TL1D or TL1S is longer than a second touch line TL2D or TL2S as shown in FIG. 22 will be specifically described as follows.

For example, a ratio DMR of an area, which a dummy metal DM occupies within the area of a first touch electrode TE1a, TE1b, TE1c, or TE1d electrically connected to a first touch line TL1D or TL1S having a long length may be higher than a ratio DMR of an area, which a dummy metal DM occupies within the area of a second touch electrode TE2a, TE2b, TE2c, or TE2d electrically connected to a second touch line TL2D or TL2S having a short length.

In another example, a dummy metal DM may exist within the area of a first touch electrode TE1a, TE1b, TE1c, or TE1d electrically connected to a first touch line TL1D or TL1S having a longer length, and a dummy metal DM may not exist within the area of a second touch electrode TE2a, TE2b, TE2c, or TE2d electrically connected to a second touch line TL2D or TL2S having a shorter length.

Referring to the example of FIG. 22, the first touch line TL1D or TL1S may be longer than the second touch line TL2D or TL2S.

Therefore, when a dummy metal ratio or whether a dummy metal exists has not been adjusted, i.e. a dummy metal ratio or whether a dummy metal exists is the same for each touch electrode TE, a parasitic capacitance Cp which a first touch electrode TE1a, TE1b, TE1c, or TE1d incurs with a cathode CATH therebetween is greater than a parasitic capacitance Cp which a second touch electrode TE2a, TE2b, TE2c, or TE2d incurs with a cathode CATH therebetween.

According to the application of a parasitic capacitance difference reducing structure as described above, a ratio DMR of an area, which a dummy metal DM occupies within the area of the first touch electrode TE1a, TE1b, TE1c, or TE1d gets higher than a ratio DMR of an area, which a dummy metal DM occupies within the area of a second touch electrode TE2a, TE2b, TE2c, or TE2d.

When the parasitic capacitance difference reducing structure is applied, the first touch electrode TE1a, TE1b, TE1c, or TE1d has a dummy metal ratio DMR higher than that of the second touch electrode TE2a, TE2b, TE2c, or TE2d. Therefore, a ratio (effective electrode ratio) of a metal electrode part which serves as an actual electrode among the first touch electrode TE1a, TE1b, TE1c, or TE1d gets lower than a ratio (effective electrode ratio) of a metal electrode part which serves as an actual electrode among the second touch electrode TE2a, TE2b, TE2c, or TE2d.

Therefore, when the parasitic capacitance difference reducing structure is applied, in the case of the first touch electrode TE1a, TE1b, TE1c, or TE1d, there is no a parasitic capacitance compensation amount, or a parasitic capacitance compensation amount becomes smaller. Accordingly, a parasitic capacitance Cp incurred between the first touch electrode TE1a, TE1b, TE1c, or TE1d and the cathode CATH may not be changed or become slightly greater in comparison with the case before the parasitic capacitance difference reducing structure is applied.

However, when the parasitic capacitance difference reducing structure is applied, in the case of the second touch electrode TE2a, TE2b, TE2c, or TE2d, a parasitic capacitance compensation amount becomes relatively greater. Accordingly, a parasitic capacitance Cp incurred between the second touch electrode TE2a, TE2b, TE2c, or TE2d and the cathode CATH may become relatively greater in comparison with the case before the parasitic capacitance difference reducing structure is applied.

Consequently, a parasitic capacitance difference which has existed before the parasitic capacitance difference reducing structure is applied may be reduced and removed.

Figure 23:
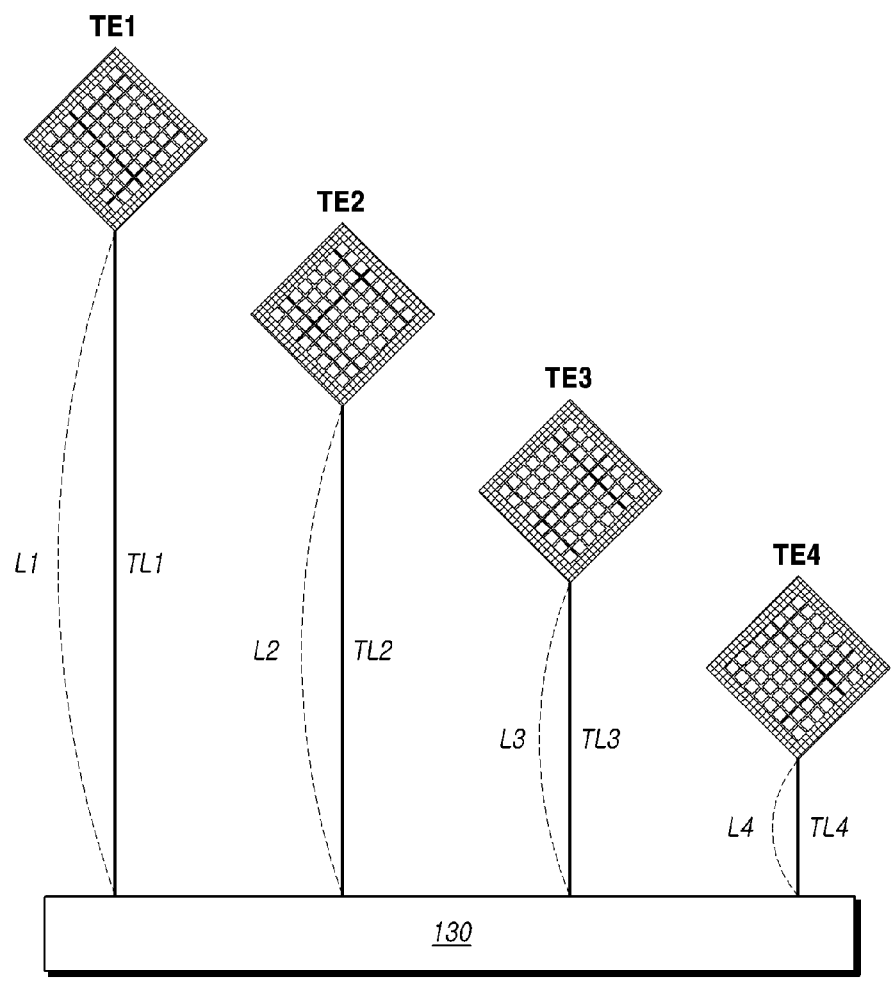
FIGS. 23 and 24 are diagrams illustrating an example of a parasitic capacitance difference reducing structure in an active area, in the touch display device according to the present disclosure.
Figure 24:
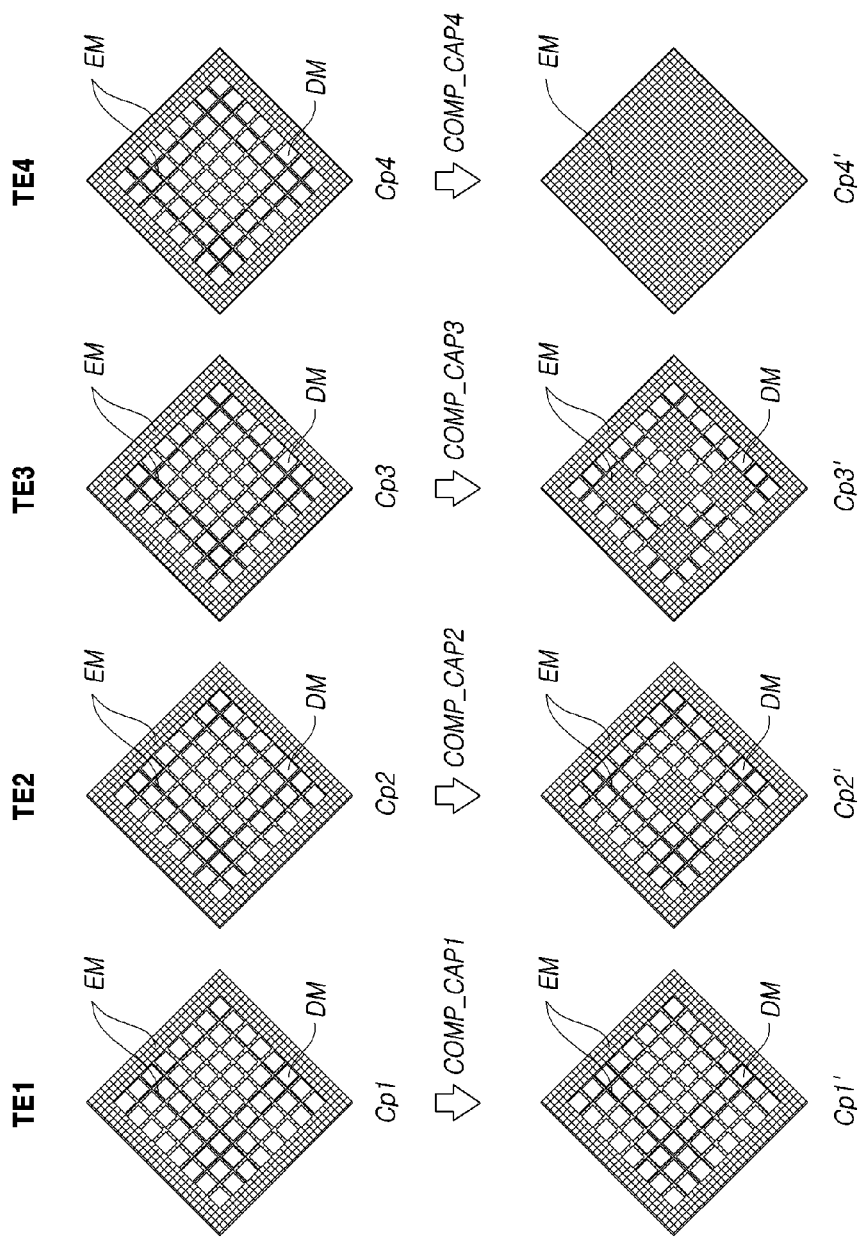

FIGS. 23 and 24 are a diagram illustrating an example of a parasitic capacitance difference reducing structure in an active area A/A, in the touch display device 100 according to the present disclosure.

Referring to FIG. 23, four touch electrodes TE1, TE2, TE3, and TE4 are electrically connected to the touch circuit 130 through four respective touch lines TL1, TL2, TL3, and TL4 having different lengths from each other. The four touch electrodes TE1, TE2, TE3, and TE4 may be a driving touch electrode or a sensing touch electrode.

The length of the touch line TL1 is L1, the length of the touch line TL2 is L2, the length of the touch line TL3 is L3, and the length of the touch line TL4 is L4.

The lengths of the touch lines TL1, TL2, TL3, and TL4 decrease in a sequence of the touch lines TL1 to TL4 (L1>L2>L3>L4).

The four touch electrodes TE1, TE2, TE3, and TE4 as shown in FIG. 23 correspond to the case where whether a dummy metal DM exists or a dummy metal ratio DMR is not adjusted, i.e. a parasitic capacitance difference reducing structure is not applied thereto.

The structure of four touch electrodes TE1, TE2, TE3, and TE4 will be described before or after the parasitic capacitance difference reducing structure is applied, with reference to FIG. 24.

A parasitic capacitance difference occurs as follows before the parasitic capacitance difference reducing structure is applied.

A parasitic capacitance Cp1 which the touch electrode TE1 incurs with the cathode CATH, a parasitic capacitance Cp2 which the touch electrode TE2 incurs with the cathode CATH, a parasitic capacitance Cp3 which the touch electrode TE3 incurs with the cathode CATH, and a parasitic capacitance Cp4 which the touch electrode TE4 incurs with the cathode CATH have decreasing values in sequence (Cp1>Cp2>Cp3>Cp4) due to a length relation (L1>L2>L3>L4) of four touch lines TL1, TL2, TL3, and TL4.

When the parasitic capacitance difference reducing structure is applied, a dummy metal ratio in the area of the touch electrode TE1, a dummy metal ratio in the area of the touch electrode TE2, a dummy metal ratio in the area of the touch electrode TE3, and a dummy metal ratio in the area of the touch electrode TE4 have decreasing values in sequence. A dummy metal DM may not exist in the area of the touch electrode TE4.

That is, when the parasitic capacitance difference reducing structure is applied, an effective electrode ratio in the area of the touch electrode TE1, an effective electrode ratio in the area of the touch electrode TE2, an effective electrode ratio in the area of the touch electrode TE3, and an effective electrode ratio in the area of the touch electrode TE4 increase in sequence.

Therefore, when the parasitic capacitance difference reducing structure is applied, a parasitic capacitance compensation amount COMP_CAP1 in the area of the touch electrode TE1, a parasitic capacitance compensation amount COMP_CAP2 in the area of the touch electrode TE2, a parasitic capacitance compensation amount COMP_CAP3 in the area of the touch electrode TE3, and a parasitic capacitance compensation amount COMP_CAP4 in the area of the touch electrode TE4 increase in sequence (COMP_CAP1<COMP_CAP2<COMP_CAP3<COMP_CAP4).

In the case where the parasitic capacitance difference reducing structure is applied, even when four touch lines TL1, TL2, TL3, and TL4 have a length difference (L1>L2>L3>L4) therebetween, a parasitic capacitance Cp1' which the touch electrode TE1 incurs with the cathode CATH, a parasitic capacitance Cp2' which the touch electrode TE2 incurs with the cathode CATH, a parasitic capacitance Cp3' which the touch electrode TE3 incurs with the cathode CATH, and a parasitic capacitance Cp4' which the touch electrode TE4 incurs with the cathode CATH become identical or similar to each other (Cp1'=Cp2'=Cp3'=Cp4').

As shown in FIG. 24, when a dummy metal ratio is reduced, i.e. a dummy metal DM is changed into a metal electrode EM corresponding to a touch electrode TE, the change may start from the center area of the touch electrode area.

Figure 25:
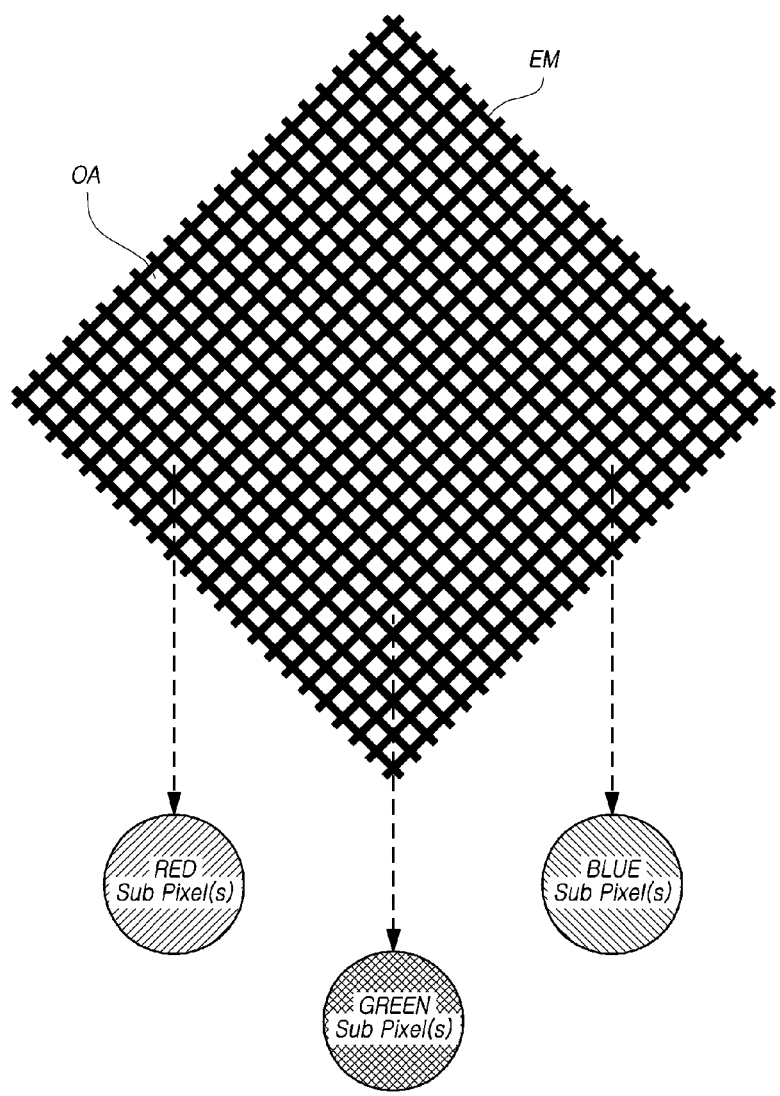
FIG. 25 is a diagram showing a corresponding relation between the area of a mesh-type touch electrode and the area of a subpixel, in the touch display device according to the present disclosure.

FIG. 25 is a diagram showing a corresponding relation between the area of a mesh-type touch electrode TE and the area of a subpixel, in the touch display device 100 according to the present disclosure.

Referring to FIG. 25, in the touch display device 100 according to the present disclosure, each of the plurality of touch electrodes TE may be a metal electrode EM which is patterned in a mesh type and thus has holes OA therethrough. A hole OA may be referred to as an open area.

Each of holes OA in a touch electrode TE disposed by patterning a metal electrode EM in a mesh type may correspond to a light emitter of at least one subpixel.

For example, when the display panel 110 is an LCD panel, a light emitter of a subpixel may include a pixel electrode or a color filter. When the display panel 110 is an OLED panel, a light emitter of a subpixel may include an organic light emitting layer, an anode electrode of an Organic Light Emitting Diode (OLED), etc., and may include a color filter according to the circumstances.

As described above, in a plan view, a metal electrode EM of a touch electrode TE is patterned such that a light emitter of at least one subpixel correspondingly exists at each of the positions of open areas OA existing in the area of the touch electrode TE as described above. Accordingly, even when the metal electrode EM is formed of an opaque material, the luminous efficiency of the display panel 110 may be increased.

Figure 26:
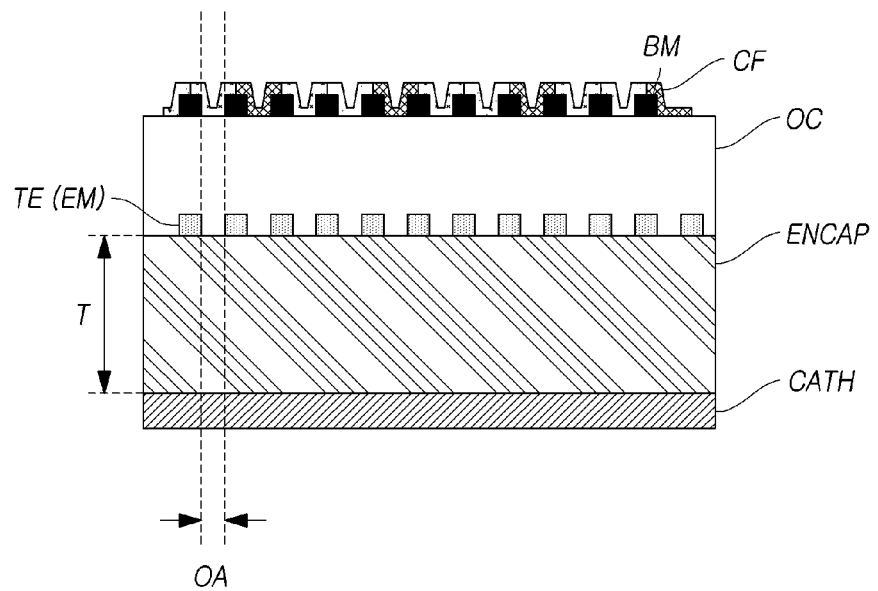
FIGS. 26 and 27 are views illustratively showing the positions of a color filter and a black matrix, in the touch display device according to the present disclosure.
Figure 27:
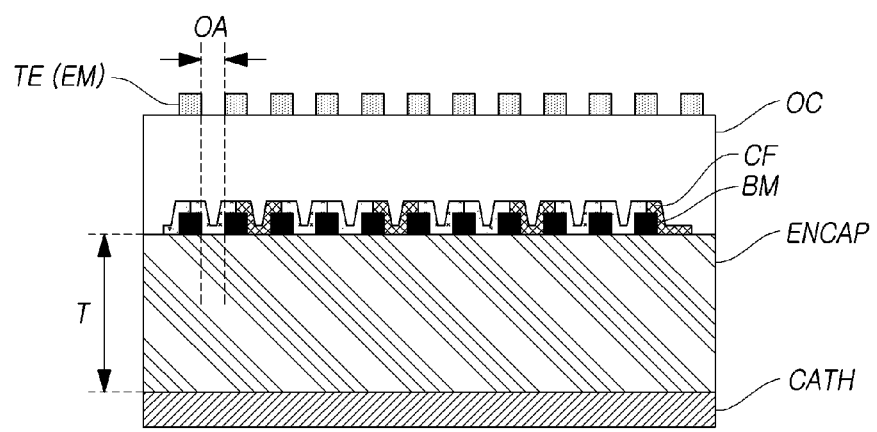

FIGS. 26 and 27 are views illustratively showing the positions of a color filter and a black matrix, in the touch display device 100 according to the present disclosure.

Referring to FIGS. 26 and 27, a cathode CATH of an Organic Light Emitting Diode OLED may exist under an encapsulation layer ENCAP.

The thickness T of the encapsulation layer ENCAP may be, for example, 5 micrometers or more.

As described above, the thickness of the encapsulation layer ENCAP is designed to be 5 micrometers or more, thereby reducing parasitic capacitances incurred between the cathode CATH of the Organic Light Emitting Diode OLED and touch electrodes TE. Accordingly, the parasitic capacitance may be prevented from degrading touch sensitivity.

Each of a plurality of touch electrodes TE may be a metal electrode EM which is patterned in a mesh shape having a plurality of open areas OA, and in a vertical view, at least one subpixel or the light emitter thereof may exist in the plurality of open areas OA.

As described above, in a plan view, a metal electrode EM of a touch electrode TE is patterned such that a light emitter of at least one subpixel correspondingly exists at each of the positions of open areas OA existing in the area of the touch electrode TE as described above. Accordingly, the opening ratio and the luminous efficiency of the display panel 110 may be increased.

Therefore, as shown in FIGS. 26 and 27, the position of a black matrix BM corresponds to the position of a metal electrode EM of a touch electrode TE.

The positions of a plurality of color filters CF correspond to the positions of a plurality of touch electrodes TE, respectively.

As described above, a plurality of color filters CF are located on positions corresponding to the positions of a plurality of open areas OA, respectively, whereby an organic light emitting display panel (particularly, the case where a white OLED is used) and the touch display device 100 having an excellent luminous performance may be provided.

A vertical position relation between color filters CF and touch electrodes TE will be described as follows.

As shown in FIG. 26, a plurality of color filters CF and black matrixes BM may be located above a plurality of touch electrodes TE.

That is, the color filters CF may be located above a metal touch sensor, such as a touch electrode TE and a touch line TL while being located above the encapsulation layer ENCAP.

The plurality of color filters CF and black matrixes BM may be located on an over-coating layer OC located on the plurality of touch electrodes TE.

As shown in FIG. 27, a plurality of color filters CF and black matrixes BM may be located under a plurality of touch electrodes TE.

The plurality of touch electrodes TE may be located on an over-coating layer OC located on the plurality of color filters CF and black matrixes BM.

That is, the color filters CF may be located between a metal touch sensor, such as a touch electrode TE and a touch line TL, and the encapsulation layer ENCAP while being located on the encapsulation layer ENCAP.

As described above, in consideration of a display performance, such as a luminous performance, and a touch performance, the OLED display-type touch display device 100 having an optimal position relation between color filters CF and touch electrodes TE may be provided.

Meanwhile, the conventional attempts to mount the touch panel TSP including touch electrodes TE in the display panel 110 have been made to improve convenience in manufacturing the touch display device 100 and reduce the size thereof.

However, there are significant difficulty or many restrictions in mounting the touch panel TSP in the display panel 110, which is an organic light emitting display panel.

For example, during a process of manufacturing the display panel 110, which is an organic light emitting display panel, there is a limitation in which a high temperature process for forming, in the panel, touch electrodes TE generally formed of a metal material cannot be freely performed due to an organic material.

Due to the restriction factors, such as the process and the structural characteristics of an organic light emitting display panel, it was difficult to arrange touch electrodes TE as a touch sensor in the display panel 110, which is an organic light emitting display panel. Therefore, a touch structure has been implemented by a conventional method of attaching the touch panel TSP to the display panel 110, which is an organic light emitting display panel, instead of mounting the touch panel TSP in the display panel 110.

However, as illustrated in FIGS. 26 and 27, through a Touch On Encapsulation Layer structure (TOE structure) in which touch electrodes TE are disposed on an encapsulation layer ENCAP, and a Color On Encapsulation Layer structure (COE structure) in which color filters CF are disposed on an encapsulation layer ENCAP, the display panel 110, which is an organic light emitting device panel in which the touch panel TSP having an excellent display performance and touch performance is mounted, may be provided.

One among two-way parasitic capacitance difference reducing structures (1. Adjustment of the size of an overlapping area between a touch electrode TE and a capacity compensation pattern COMP, and 2. Adjustment of a dummy metal ratio within a touch electrode area) as described above may be applied, and all of the two-way parasitic capacitance difference reducing structures may be applied.

The present disclosure described above can provide a touch display device and a touch panel, having a structure which can reduce the difference of parasitic capacitances, which occur in metal touch sensors, such as touch electrodes and touch lines, regardless of a pattern in which the metal touch sensors, such as the touch electrodes or the touch lines, are arranged in a touch panel.

In addition, the present disclosure can provide a touch display device and a touch panel, having a structure which can reduce the difference of parasitic capacitances, which occur in metal touch sensors, such as touch electrodes and touch lines, even when the touch lines have different lengths.

In addition, the present disclosure can provide a touch display device and a touch panel, having a parasitic capacitance difference reducing structure in a non-active region corresponding to a non-image display region.

In addition, the present disclosure can provide a touch display device and a touch panel, having a parasitic capacitance difference reducing structure in an active region corresponding to an image display region.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the present disclosures disclosed in the present disclosure are only for describing, but not limiting, the technical idea of the present disclosure, and the scope of the technical idea of the present disclosure is not limited by the aspects of the present disclosure. The scope of the present disclosure shall be construed on the basis of the accompanying claims in such a manner that all of the technical ideas included within the scope equivalent to the claims belong to the present disclosure.

What is claimed is:

1. A touch display device comprising:
   a substrate including an active area where an image is displayed and a non-active area disposed outside the active area;
   a plurality of touch electrodes disposed in the active area and a plurality of touch lines electrically connected to at least some of the plurality of touch electrodes disposed in a first side of the non-active area;
   an extension part located in a second side of the non-active area that is different from the first side of the non-active area, directly connected with an adjacent outermost peripheral touch electrode, wherein the extension part does not contact the plurality of touch lines;
   a capacity compensation pattern compensating for a difference in parasitic capacitance caused by a length difference in the plurality of touch lines, wherein the capacity compensation pattern is disposed in the second side of the non-active area, vertically overlapping with the extension part and disposed in a layer different from the plurality of touch electrodes and the plurality of touch lines; and
   a plurality of auxiliary touch lines corresponding to the plurality of touch lines, spaced apart by an insulating layer from the plurality of touch lines, and spaced apart from the capacity compensation pattern including a plurality of layers identical to one another in the second side of the non-active area,
   wherein at least one of the plurality of touch electrodes and at least one of the plurality of touch lines directly contact each other in the first side of the non-active area, and the plurality of touch electrodes and the plurality of touch lines do not contact each other in the second side of the non-active area, and the at least one of the plurality of touch lines is extended to the second side of the non-active area, and
   wherein the extension part is located vertically higher than the adjacent outermost peripheral touch electrode, and both of the extension part and the compensation pattern are parallel with the plurality of touch lines and disposed between the plurality of touch lines and the adjacent outermost peripheral touch electrode,
   wherein the extension part includes a first extension part connected to a first touch line among the plurality of touch lines through a first outermost peripheral touch electrode and a second extension part connected to a second touch line among the plurality of touch lines through a second outermost peripheral touch electrode, and the first touch line is longer than the second touch line, wherein the capacity compensation pattern includes a first capacity compensation pattern partially overlapping with the first extension part and a second capacity compensation pattern completely overlapping with the second extension part, and wherein the first capacity compensation pattern and the first extension part completely overlap with each other at a first overlapping area, and the second capacity compensation pattern and the second extension part completely overlap with each other at a second overlapping area, the first overlapping area being smaller than the second overlapping area.

2. The touch display device of claim 1, wherein the plurality of touch lines is disposed in a periphery of a touch electrode area in which the plurality of touch electrodes are arranged, and the at least one of the plurality of touch lines has a different length.

3. The touch display device of claim 1, wherein the capacity compensation pattern partially overlaps an area of the first outermost peripheral touch electrode and an area of the second outermost peripheral touch electrode, and wherein a size of the partially overlapping area between the first outermost peripheral touch electrode and the capacity compensation pattern and a size of the partially overlapping area between the second outermost peripheral touch electrode and the capacity compensation pattern are different from each other.

4. The touch display device of claim 3, wherein a length of the first touch line electrically connected to the first outermost peripheral touch electrode is longer than a length of the second touch line electrically connected to the second outermost peripheral touch electrode, and a size of the partially overlapping area between the first outermost peripheral touch electrode and the capacity compensation pattern is smaller than a size of an overlapping area between the second outermost peripheral touch electrode and the capacity compensation pattern.

5. The touch display device of claim 4, wherein a size of an area in which the first outermost peripheral touch electrode overlaps the capacity compensation pattern is smaller than a size of an area in which the second outermost peripheral touch electrode overlaps the capacity compensation pattern.

6. The touch display device of claim 4, wherein, in the capacity compensation pattern, a width of a part in which the capacity compensation pattern overlaps the first outermost peripheral touch electrode is smaller than a width of a part in which the capacity compensation pattern overlaps the second outermost peripheral touch electrode.

7. The touch display device of claim 6, wherein, in the capacity compensation pattern, a part in which the capacity compensation pattern and the first outermost peripheral touch electrode overlap each other is integrated with or separated from a part in which the capacity compensation pattern and the second outermost peripheral touch electrode overlap each other.

8. The touch display device of claim 1, wherein the capacity compensation pattern is applied with a ground voltage or a voltage having a level different from that of a voltage applied to the plurality of touch electrodes.

9. The touch display device of claim 1, wherein a touch panel is mounted inside a display panel, wherein the touch panel is mounted in the display panel and includes a cathode, an encapsulation layer located on the cathode, the insulating layer located on the encapsulation layer, and a touch sensor metal on the insulating layer.

10. The touch display device of claim 9, wherein the touch sensor metal includes the plurality of touch electrodes and the plurality of touch lines and the capacity compensation pattern is located between the encapsulation layer and the insulating layer.

11. The touch display device of claim 1, wherein a touch panel is mounted inside or outside a display panel having the active area and the non-active area, the capacity compensation pattern is correspondingly located to the non-active area, and a part in which the outermost peripheral touch electrode does not overlap the capacity compensation pattern is correspondingly located on the active area, and a part in which the at least one outermost peripheral touch electrode overlaps the capacity compensation pattern is correspondingly located on the non-active area.

12. The touch display device of claim 1, wherein each of the plurality of touch electrodes is a metal electrode that is patterned in a mesh form and has holes therethrough, and each of the holes corresponds to a light emitter of at least one subpixel.

13. The touch display device of claim 1, further comprising at least one dummy metal disconnected from a metal electrode is disposed in an area where the plurality of touch electrodes is located.

14. The touch display device of claim 1, further comprising a touch circuit driving a touch panel and sensing a touch or a touch position.

15. A touch panel comprising:
a substrate including an active area where an image is displayed, and a non-active area disposed outside the active area including first and second sides different from each other;
a plurality of touch electrodes located in the active area and including an outermost peripheral touch electrode at an outermost peripheral region of the touch panel and the outermost peripheral touch electrode having an extension part, wherein the extension part is located in the second side of the non-active area, directly connected with an adjacent outermost peripheral touch electrode and does not contact a plurality of touch lines,
wherein the plurality of touch lines electrically is connected to at least some of the plurality of touch electrodes disposed in the first side of the non-active area;
a capacity compensation pattern compensating for a difference in parasitic capacitance caused by a length difference in the plurality of touch lines, wherein the capacity compensation pattern is disposed in the second side of the non-active area, vertically overlapping with the extension part and disposed in a layer different from the plurality of touch electrodes and the plurality of touch lines; and
a plurality of auxiliary touch lines corresponding to the plurality of touch lines, spaced apart by an insulating layer from the plurality of touch lines and spaced apart from the capacity compensation pattern including a plurality of layers identical to one another in the second side of the non-active area,
wherein at least one of the plurality of touch electrodes and at least one of the plurality of touch lines directly contact each other in the first side non-active area, and the plurality of touch electrodes and the plurality of touch lines do not contact each other in the second side non-active area, and the at least one of the plurality of touch lines runs over the second side non-active area,
wherein the extension part is located vertically higher than the adjacent outermost peripheral touch electrode, and both of the extension part and the compensation pattern are parallel with the plurality of touch lines and disposed between the plurality of touch lines and the adjacent outermost peripheral touch electrode, wherein the extension part includes a first extension part connected to a first touch line among the plurality of touch lines through a first outermost peripheral touch electrode and a second extension part connected to a second touch line among the plurality of touch lines through a second outermost peripheral touch electrode, and the first touch line is longer than the second touch line, wherein the capacity compensation pattern includes a first capacity compensation pattern partially overlapping with the first extension part and a second capacity compensation pattern completely overlapping with the second extension part, and wherein the first capacity compensation pattern and the first extension part completely overlap with each other at a first overlapping area, and the second capacity compensation pattern and the second extension part completely overlap with each other at a second overlapping area, the first overlapping area being smaller than the second overlapping area.

16. The touch panel of claim 15, wherein the touch panel is mounted inside or outside a display panel comprising the active area and the non-active area, the capacity compensation pattern is correspondingly located to the non-active area, and a part in which the outermost peripheral touch electrode does not overlap with the capacity compensation pattern is correspondingly located on the active area, and a part in which the outermost peripheral touch electrode overlaps with the capacity compensation pattern is correspondingly located on the non-active area.

17. The touch panel of claim 15, wherein the capacity compensation pattern partially overlaps an area of the first outermost peripheral touch electrode and an area of the second outermost peripheral touch electrode, and a size of an overlapping area between the first outermost peripheral touch electrode and the capacity compensation pattern and a size of an overlapping area between the second outermost peripheral touch electrode and the capacity compensation pattern are different from each other.

18. The touch panel of claim 17, wherein a length of the first touch line electrically connected to the first outermost peripheral touch electrode is longer than a length of the second touch line electrically connected to the second outermost peripheral touch electrode, and a size of an overlapping area between the first outermost peripheral touch electrode and the capacity compensation pattern is smaller than a size of an overlapping area between the second outermost peripheral touch electrode and the capacity compensation pattern.

19. A touch display device comprising:

a substrate including an active area where an image is displayed and a non-active area disposed outside the active area and including first and second sides different from each other;

an encapsulation layer on the substrate;

a capacity compensation pattern compensating for a difference in parasitic capacitance caused by a length difference in a plurality of touch lines, wherein the capacity compensation pattern is formed on the encapsulation layer in the second side of the non-active area and that is grounded, vertically overlapping with an extension part, and disposed in a layer different from a plurality of touch electrodes and the plurality of touch lines, wherein the extension part is located in the second side of the non-active area, directly connected with an adjacent outermost peripheral touch electrode, and not contacting the plurality of touch lines;

a plurality of auxiliary touch lines formed on the encapsulation layer in the second side of the non-active area, formed on a same layer as the capacity compensation pattern, and disposed to be spaced apart by a distance greater than spacing of the capacity compensation pattern from the active area; and an insulating layer formed on the encapsulation layer, the capacity compensation pattern, and the plurality of auxiliary touch lines;

wherein the plurality of touch electrodes is located in the active area and disposed on the insulating layer in the active area and patterned in a mesh form, wherein the plurality of touch lines is disposed in an area corresponded to the plurality of auxiliary touch lines on the insulating layer in the first side of the non-active area, formed on a same layer as the plurality of touch electrodes, and electrically connected to at least some of the plurality of touch electrodes; and wherein at least one of the plurality of touch electrodes and at least one of the plurality of touch lines directly contact each other in the first side non-active area, and the plurality of touch electrodes and the plurality of touch lines do not contact each other in the second side non-active area, and the at least one of the plurality of touch lines runs over the second side non-active area, wherein the extension part is located vertically higher than the adjacent outermost peripheral touch electrode, and both of the extension part and the compensation pattern are parallel with the plurality of touch lines and disposed between the plurality of touch lines and the adjacent outermost peripheral touch electrode, wherein the extension part includes a first extension part connected to a first touch line among the plurality of touch lines through a first outermost peripheral touch electrode and a second extension part connected to a second touch line among the plurality of touch lines through a second outermost peripheral touch electrode, and the first touch line is longer than the second touch line, wherein the capacity compensation pattern includes a first capacity compensation pattern partially overlapping with the first extension part and a second capacity compensation pattern completely overlapping with the second extension part, wherein the first capacity compensation pattern and the first extension part completely overlap with each other at a first overlapping area, and the second capacity compensation pattern and the second extension part completely overlap with each other at a second overlapping area, the first overlapping area being smaller than the second overlapping area.

20. The touch display device of claim 19, wherein a size of an area in which the adjacent outermost peripheral touch electrode and the capacity compensation pattern overlap is inversely proportional to a length of the plurality of touch lines connected to the adjacent outermost peripheral touch electrode.

21. The touch display device of claim 20, wherein each of the plurality of touch electrodes includes a dummy metal, and a ratio of the dummy metal in each of the plurality of touch electrodes is proportional to the length of the plurality of touch lines connected to the plurality of touch electrodes.

* * * * *